(12) United States Patent
Busch et al.

(10) Patent No.: US 7,207,645 B2
(45) Date of Patent: Apr. 24, 2007

(54) PRINTER COLOR CORRECTION

(76) Inventors: Brian D. Busch, 582 Peakham Rd., Sudbury, MA (US) 01776; Daniel P. Bybell, 40 Warren St., Medford, MA (US) 02155; William J. Donovan, 29 Laurel Dr., Hudson, MA (US) 01749; Felix J. Lin, 164 Pine Hill Rd., Chelmsford, MA (US) 01824; Suhail S. Saquib, 33 Trowbridge La., Shrewsbury, MA (US) 01545; Jay E. Thornton, 56 Lincoln St., Watertown, MA (US) 02472

( * ) Notice: Subject to any disclaimer, the term of this patent is extended or adjusted under 35 U.S.C. 154(b) by 272 days.

(21) Appl. No.: 10/818,883

(22) Filed: Apr. 6, 2004

(65) Prior Publication Data

US 2005/0093923 A1    May 5, 2005

Related U.S. Application Data

(60) Provisional application No. 60/516,217, filed on Oct. 31, 2003.

(51) Int. Cl.
B41J 29/393    (2006.01)

(52) U.S. Cl. .................. 347/19; 358/518; 358/523
(58) Field of Classification Search .................. 358/518
See application file for complete search history.

(56) References Cited

U.S. PATENT DOCUMENTS 4,862,255 A    8/1989    Takanashi et al. ............ 358/80
4,884,102 A    11/1989   Terashita ..................... 355/77
5,142,356 A    8/1992    Usami et al. ................. 358/80
5,448,379 A    9/1995    Ishihara et al. ............. 358/518
5,563,724 A *  10/1996   Boll et al. ................... 358/502
6,106,094 A    8/2000    Otani et al. .................. 347/19
6,280,914 B1   8/2001    Keech et al. ............... 430/496
6,284,445 B1   9/2001    Keech et al. ............ 430/495.1

(Continued)

FOREIGN PATENT DOCUMENTS

EP    0 676 892 A2    10/1995

(Continued)

OTHER PUBLICATIONS

"A Neutral Axis Calibration Method Using 3D Inverse Interpolation", IS&T/SID's Eleventh Color Imaging Conference (2003), Hewlett Packard Company, by Wu, Abstract.

(Continued)

Primary Examiner—Manish S. Shah
Assistant Examiner—Brian J. Goldberg

(57) ABSTRACT

Techniques are disclosed for performing color correction in a color printer. An RGB test image is printed to produce a printed calibration image. Colors in the printed calibration image are measured and compared to expected color values. A color corrector generates a printer lookup table (LUT) based on this comparison. The LUT may be generated based on models of the printer's print engine and previous LUTs. The color corrections are applied to subsequent print jobs to improve the quality of color output. Color measurement and correction may be performed using a closed-loop system contained within the printer that includes a color measurement device (such as a scanner) and a computer.

26 Claims, 11 Drawing Sheets

U.S. PATENT DOCUMENTS

| | | | |
|---|---|---|---|
| 6,320,668 B1 | 11/2001 | Kim | 358/1.1 |
| 6,330,078 B1 | 12/2001 | Wang | 358/1.9 |
| 6,381,037 B1 * | 4/2002 | Balasubramanian et al. | 358/3.23 |
| 6,956,967 B2 * | 10/2005 | Gindele et al. | 382/167 |

FOREIGN PATENT DOCUMENTS

| | | |
|---|---|---|
| EP | 0 676 892 A3 | 10/1995 |
| EP | 0 747 853 A2 | 12/1996 |
| EP | 0 747 853 A3 | 12/1996 |
| JP | 1-243251 | 9/1989 |
| JP | 01234251 A | 9/1989 |
| JP | 4-157979 | 5/1992 |
| JP | 04157979 A | 5/1992 |
| JP | 9-116768 | 5/1997 |
| JP | 09116768 A | 5/1997 |
| JP | 2000-280532 | 10/2000 |
| JP | 2000280532 A | 10/2000 |
| JP | 2002-290757 | 10/2002 |
| JP | 2002290757 A | 10/2002 |
| JP | 2002-344755 | 11/2002 |
| JP | 2002344755 A | 11/2002 |
| WO | 99/01286 | 1/1999 |

OTHER PUBLICATIONS

"Inverse problems in color device characterization", Xerox Innovation Group, by R. Bala.

"Refinement of printer transformations using weighted regression", by Balasubramanian et al., SPIE, vol. 2658, XP008020360, pp. 334-340.

"Feedback for Printer Color Calibration", by Wang, IS&T's NIP 15, Oct. 1999.

* cited by examiner

PRINTER COLOR CORRECTION

REFERENCE TO RELATED APPLICATIONS

This application claims the benefit of U.S. Provisional Patent Application Ser. No. 60/516,217, filed Oct. 31, 2003.

This application is related to the following co-pending and commonly-owned U.S. Patent Applications, all of which are hereby incorporated by reference herein:

U.S. patent application Ser. No. 10/080,883, filed Feb. 22, 2002, entitled "A High-Speed Photo-Printing Apparatus", now U.S. Pat. No. 6,842,186 B2;

U.S. patent application Ser. No. 10/254,186, filed Sep. 25, 2002, entitled "Registration Error Reduction in a Tandem Printer", now U.S. Pat. No. 6,739,688 B2; and U.S. patent application Ser. No. 10/698,209, filed Oct. 31, 2003, entitled "Printer Color Registration Correction."

BACKGROUND

1. Field of the Invention

The present invention relates to color correction in digital images and, more particularly, to color correction in printed digital images.

2. Related Art

Various kinds of printers are well-known in the computing and digital image arts. Such printers include, for example dot-matrix printers, laser printers, inkjet printers and thermal printers. Thermal printers, for example, use thermal energy (heat) to produce printed output. More specifically, thermal printers typically contain a linear array of heating elements (also referred to herein as "print head elements") that print on an output medium by, for example, transferring dye/pigment from a donor sheet to the output medium or by initiating a color-forming reaction in the output medium. The output medium is typically a porous receiver receptive to the transferred dye/pigment, or a paper coated with the color-forming chemistry. Each of the print head elements, when activated, forms color on the medium passing underneath the print head element, creating a spot having a particular density. Regions with larger or denser spots are perceived as darker than regions with smaller or less dense spots. Digital images are rendered as two-dimensional arrays of very small and closely-spaced spots.

Color thermal printers may include either a single thermal print head or multiple thermal print heads, each of which is responsible for printing a distinct colorant. In a four-head printer, for example, the four print heads may be responsible for printing cyan, magenta, yellow, and black, respectively. The print heads typically are spaced some distance apart from each other in a row or other configuration.

The medium on which output is to be printed (referred to as the "output medium," "web," or "receiver") typically is provided on a continuous roll, referred to as the "receiver roll." The receiver is pulled from the receiver roll through the printer by a drive capstan roller located after the final print head. In this manner the receiver passes by and makes contact with each print head in succession. Each print head transfers dye/pigment of a corresponding colorant from a donor element to the receiver as the receiver passes by it. In this way, a four color image may be printed by successively printing each of four single-color layers on the output medium. The processes of printing distinct colors of an image at successive print stations is referred to as "tandem printing."

Consider a color digital image to be printed by a color printer. For purposes of example assume that each pixel in the image has 8-bit red, green, and blue (RGB) component values. In an ideal color printer, the relationship (referred to as the printer's "tonescale") between RGB values in the digital image to be printed and the resulting colors in the printed image would be both user-selectable and fixed over time.

The tonescales of real printers, however, do not remain fixed over time, but rather vary due to factors such as temperature and variations in the output media. Furthermore, even the tonescale of a single model of print engine may vary from engine to engine due to variations in the manufacturing process. As a result, color output may vary in accuracy over time within a single printer or from printer to printer in undesirable ways.

The process of modifying the tonescale of a color printer to compensate for such variations and, more generally, to improve the perceived quality of colors in the printed output is referred to as "color calibration" or "color correction." In general, color correction typically is initiated by printing a test image. The color characteristics of the test image are measured using a measurement device such as a densitometer, calorimeter, or spectrophotometer, and the measured characteristics are compared to desired characteristics to determine what, if any, adjustments are needed to be made to the printer's tonescale to re-optimize printer performance. These adjustments are then applied to the printer by altering settings such as the printer's lookup tables (LUTs).

High-quality color correction is becoming increasingly important as color printers become used more frequently for printing photo-quality images and as the expectations and sophistication of users increase. High-quality color correction is also particularly important in printers, such as printers used as commercial photo kiosks, that are expected to produce a high volume of high-quality output and for which manual adjustments are inconvenient or unduly burdensome. What is needed, therefore, are improved techniques for performing color correction in a color printer.

SUMMARY OF THE INVENTION

Techniques are disclosed for performing color correction in a color printer. An RGB test image is printed to produce a printed calibration image. Colors in the printed calibration image are measured and compared to expected color values. A color corrector generates a printer lookup table (LUT) based on this comparison. The LUT may be generated based on models of the printer's print engine and previous LUTs. The color corrections are applied to subsequent print jobs to improve the quality of color output. Color measurement and correction may be performed using a closed-loop system contained within the printer that includes a color measurement device (such as a scanner) and a computer.

Other features and advantages of various aspects and embodiments of the present invention will become apparent from the following description and from the claims.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DETAILED DESCRIPTION

Techniques are disclosed for performing color correction in a color printer. An RGB test image is printed to produce a printed calibration image. Colors in the printed calibration image are measured and compared to expected color values. A color corrector generates a printer lookup table (LUT) based on this comparison. The LUT may be generated based on models of the printer's print engine and previous LUTs. The color corrections are applied to subsequent print jobs to improve the quality of color output. Color measurement and correction may be performed using a closed-loop system contained within the printer that includes a color measurement device (such as a scanner) and a computer.

Figure 1:
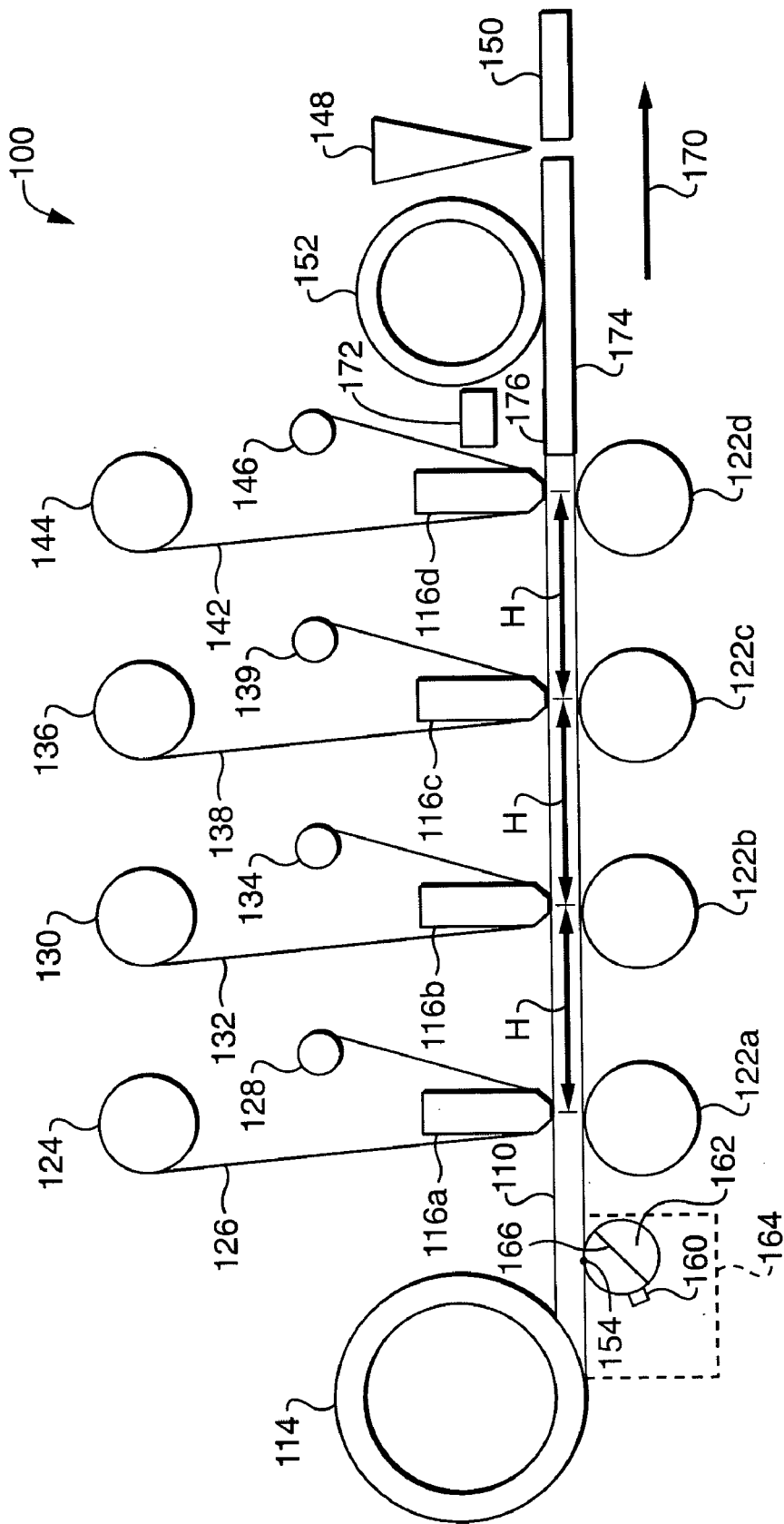
FIG. 1 is a side view of a multi-head tandem printing mechanism according to one embodiment of the present invention.

Referring to FIG. 1, a multi-head tandem printing mechanism 100 according to one embodiment of the present invention is shown. The printing mechanism 100 may, for example, be used in a commercial photo-printing kiosk, as described in more detail in the above-referenced patent application entitled "A High-Speed Photo-Printing Apparatus."

Receiver 110 is fed from a receiver roll 114. Although the path of receiver 110 is shown as straight in FIG. 1, it should be understood that other paths, for example curved or arcuate paths, may also be used. The receiver 110 is translated past three thermal print heads 116a–c, opposed by platen rollers 122a–c respectively. The first thermal print head 116a is fed from roll 124 with a donor element 126, bearing the first of the three subtractive primary colorants (cyan, magenta, or yellow). The order of printing of the colorants may vary. After printing of the first colorant, the spent donor element is taken up on a roll 128. The second thermal print head 116b is fed from roll 130 with donor element 132, corresponding to the second primary colorant. The spent donor element is taken up on roll 134. The third thermal print head 116c is fed from roll 136 with donor element 138, corresponding to the third primary colorant. The spent donor element is taken up on roll 139.

A fourth printing head (or heating element) 116d may optionally be used for applying an overcoat layer 142, which may be laminated or transferred to receiver 110. Alternatively, element 142 may be a white, opaque substrate. The overcoat or white opaque substrate 142 is fed from roll 144. If a carrier web is used for the overcoat or white opaque substrate 142, it is taken up on roll 146. If no carrier web is used, substrate 142 is simply laminated to receiver 110, and roller 146 is not needed. Following lamination or transfer of substrate 142, a cutter 148 may be used to separate the printed images, such as a final printed image 150 onto which all three primary colors have been printed. The cutter 148 may optionally separate a small sliver (not shown) of receiver 110 between images so as not to have to precisely register a single cut with the junction between successive pictures. The slivers so separated may be directed into a receptacle (not shown) for later disposal. The prints themselves may be delivered to the user by means of a chute or similar device.

Donor elements 126, 132 and 138 may comprise very thin substrates (of thickness typically in the range 2.5–8 micrometers) onto which the appropriate donor material has been coated. In the case of dye diffusion thermal transfer, the donor material is typically a dye incorporated into a polymer binder, as described for example in Hann, R. A. and Beck, N. C., J. Imaging Technol., (1990), 16(6), 138–241 and Hann, R. A., Spec. Pub. R. Soc. Chem. (1993), 133, 73–85.

In the case of thermal mass transfer, the donor material is commonly a dye or pigment formulated with a wax or resin (or a combination of the two) as vehicle, as described for example in U.S. Pat. No. 5,569,347. The donor element may be such as is described in commonly-assigned U.S. Pat. No. 6,537,410 B2, entitled: "Thermal Transfer Recording System."

The receiver 110 should be chosen so as to be compatible with the donor material used. Thus, for dye diffusion thermal transfer, the receiver 110 bears a polymer coating for accepting the transferred dyes, as described in Hann, R. A. and Beck, N. C., J. Imaging Technol., (1990), 16(6), 138–241 and Hann, R. A., Spec. Pub. R. Soc. Chem. (1993), 133, 73–85. For thermal mass transfer, the receiver may bear a microporous layer, as described for example in U.S. Pat. Nos. 5,521,626 and 5,897,254, or a softening layer, as described for example in U.S. Pat. No. 4,686,549. As described for example in U.S. Pat. No. 5,144,861, the receiver 110 used for thermal transfer media of either type are desirably compliant and of uniform thermal conductivity. One example of the receiver 110 for use in conjunction with a thermal mass transfer donor element according to the invention is described in commonly-owned U.S. patent application Ser. No. 10/159871, filed May 30, 2002, entitled "Thermal Mass Transfer Imaging System."

Receiver 110 may be opaque or transparent. In the case where receiver 110 is transparent, and a reflective print is the desired output, substrate 142 is desirably opaque, and the final image is viewed through receiver 110. In the case wherein receiver 110 is opaque, and the material transferred by element 144 is transparent, the final image is viewed through the material transferred by element 116d. The image printed in one case is the mirror image of that printed in the other.

The printing mechanism 100 may also include an optical encoder 160 mounted on a roller 162 (referred to as the "encoder roller") in contact with the receiver 110. The encoder 160 and encoder roller 162 are illustrated in outline for ease of illustration. As described in more detail in the above-referenced patent application entitled "Registration Error Reduction in a Tandem Printer," the combination of the optical encoder 160 and the encoder roller 162 may serve as a tachometer 164 to measure the transport speed (print speed) of the receiver 110 as it passes through the print mechanism 100, which information may in turn be used to reduce the effect of mechanical errors on color registration in the printed image 150.

Figure 2:
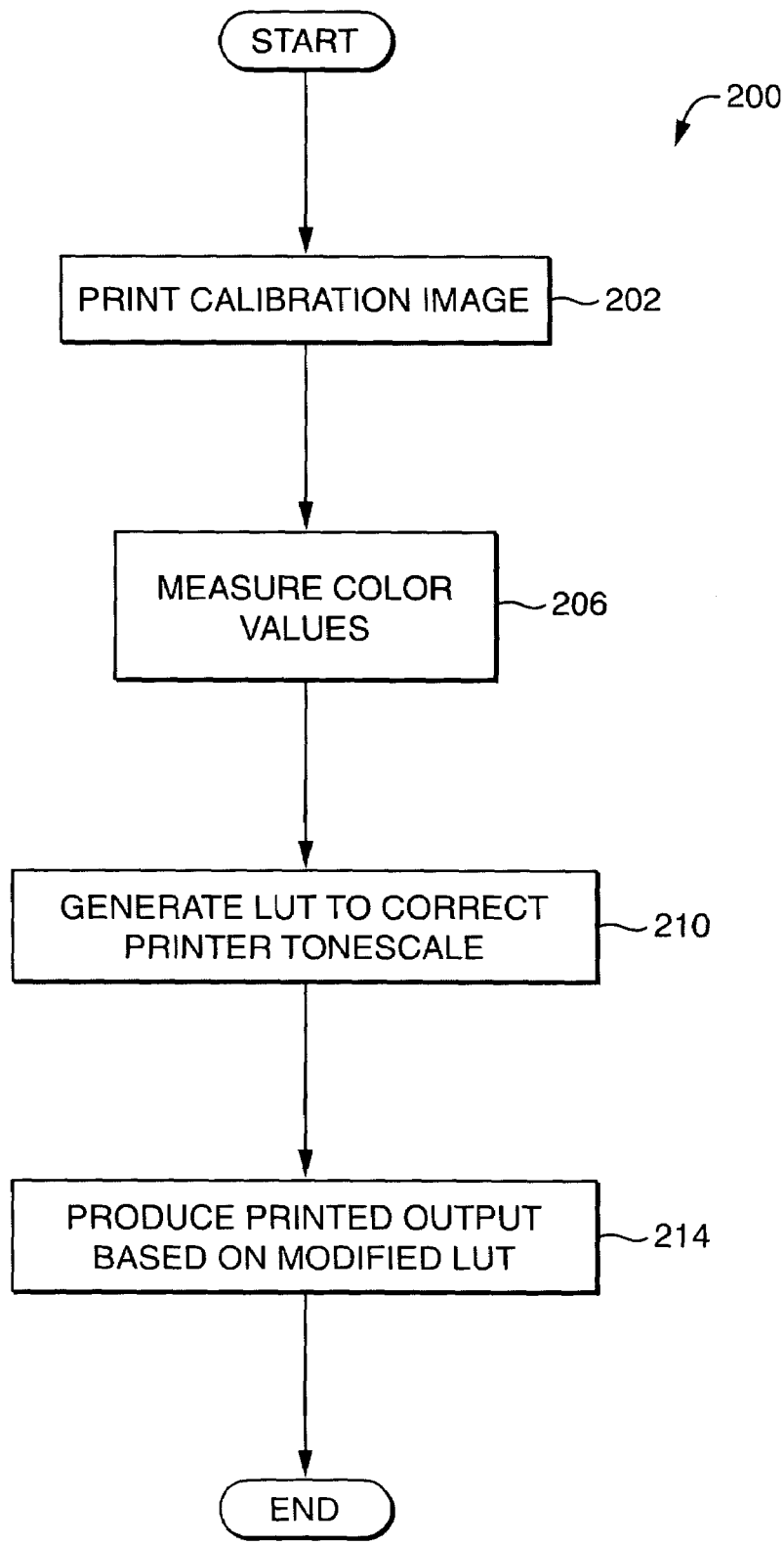
FIG. 2 is a flowchart of a method that is used in one embodiment of the present invention to generate color corrections for use in a color printer.
Figure 3:
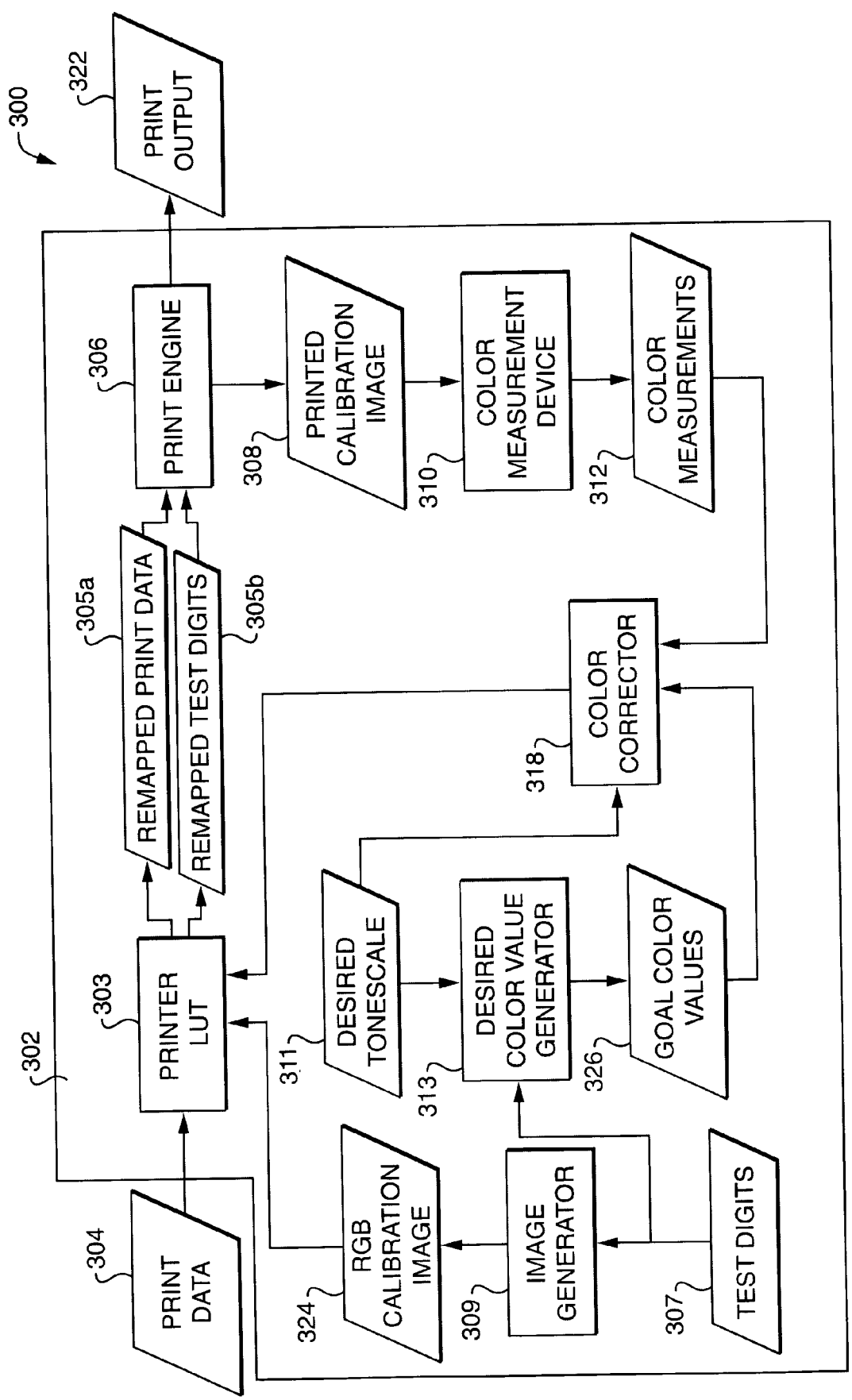
FIG. 3 is a functional block diagram of a system that performs the method of FIG. 2 according to one embodiment of the present invention.

Examples of techniques will now be described for performing color correction according to embodiments of the present invention. Referring to FIG. 2, a flowchart is shown of a method 200 that is used in one embodiment of the present invention to perform color correction in a color printer having a print mechanism such as the mechanism 100 shown in FIG. 1. Referring to FIG. 3, a functional block diagram is shown of a system 300 that includes a color printer 302 that may perform the method 200 of FIG. 2.

The printer 302 receives print data 304 to be printed in a print job. The print data 304 may, for example, be a digital photograph and the printed output 322 may be a 4"×6" print of the photograph. The printer 302 includes a lookup table (LUT) 303 that maps RGB digits in the print data 304 to remapped print data 305a. The printer 302 also includes a print engine 306 that may include a print mechanism such as the print mechanism 100 shown in FIG. 1. The print engine 306 receives the remapped print data 305a as input. The print engine 306 renders the remapped print data 305a and prints the resulting rendered image, thereby producing printed output 322. The printer LUT 303 is intended to produce remapped print data 305a having values that will cause the print engine 306 to produce printed output 322 that has optimal color characteristics.

The printer 302 also includes a set of test RGB digits 307 which are used to test the tonescale of the printer 302. The test digits 307 may, for example, include a sample of digits along the neutral axis of the printer 302. These test digits 307 may be generated adaptively based on a previous measurement of the printer's color performance. The printer 302 also includes an image generator 309 that receives the test digits 307 as input and produces an RGB calibration image 324 (also referred to as a "target") as an output. An example of the RGB calibration image 324 is shown and described below with respect to FIG. 4.

Before or after printing the printed output 322, the printer uses the RGB calibration image 324 to print a printed calibration image 308 on an output medium (FIG. 2, step 202). As shown in FIG. 3, the RGB calibration image 324 may be provided as an input to the printer LUT 303, which may produce remapped test digits 305b. The remapped test digits 305b are provided to the print engine 306, which prints the printed calibration image 308.

The printed calibration image 308 may, for example, be printed on the same roll as the printed image 150 (FIG. 1) in a portion 174 of the receiver 110 that immediately follows the printed image 150. A particular embodiment of the printed calibration image 308 will be described below with respect to FIG. 4. In general, the printed calibration image 308 may, for example, include a plurality of printed regions, each of which is intended to be printed with a distinct colorant.

The printer 302 also includes a color measurement device 310 that takes color measurements in the printed calibration image 308, thereby producing color measurements 312 (FIG. 2, step 206). Such measurements 312 may, for example, be measured in an $L^*$, $a^*$, $b^*$ color space.

The color measurements 312 may, for example, be a digital electronic representation of the printed calibration image 308 stored in an image format such as JPEG with minimal (e.g., 10%) compression to retain as much information in the image as possible. Alternatively, the color measurements 312 may be individual or aggregate (e.g., averaged) color measurements of selected regions in the printed calibration image 308.

For example, referring again to FIG. 1, the print mechanism 100 includes a scanner 172 positioned above the receiver 110. The scanner 172 is one example of the color measurement device 310. In one embodiment of the present invention, the scanner 172 is a model Lide-30 scanner available from Canon. The model Lide-30 has a field of view of 8.5"×11.7" and produces images that are 3400 pixels wide by 4680 pixels high when operated at 400DPI. The model Lide-30 is simply one example of a device that may be used as the color measurement device 310 and does not constitute a limitation of the present invention. Furthermore, although the scanner 172 is an inline device, the Lide-30 is an example of an offline device that may be used to perform color measurement after the printed image 150 has been removed from the printer 302. Embodiments of the present invention may be used with either inline or offline color measurement devices.

Note that the scanner 172, printed image 150, and receiver portion 174 are not drawn to scale in FIG. 1. As will be described in more detail below, the scanner 172 may capture a region 176 of the calibration image printed on the receiver portion 174 as the receiver portion 174 passes underneath the scanner 172.

The printer 302 also includes a desired tonescale 311 which specifies a desired mapping between input RGB digits and output color measurements. The printer 302 also includes a desired color value generator 313 that receives the desired tonescale 311 and the test RGB digits 307 and produces a set of goal color values 326 corresponding to these test digits 307. The goal color values 326, also referred to as "ideal" or "aim" values, indicate the colors that should be printed in response to the test digits 307. The goal color values 326 may, for example, be represented in an $L^*$, $a^*$, $b^*$ color space. The goal color values 326 may include densitometric and/or calorimetric values.

In one embodiment of the present invention, the goal color values 326 indicate the colors expected to be produced by the print engine 306 when the R, G, and B signals provided as inputs to the print engine 306 are equal to each other (i.e., when R=G=B). The set of inputs for which R=G=B is referred to as the "neutral axis" of the print engine 306. The goal color values 326 may include only a subset of the ideal outputs if such a subset is deemed adequate for controlling the printer's tonescale and color balance. As is well-known to those of ordinary skill in the art, the desired tonescale 311 and corresponding goal color values 326 may be developed under laboratory conditions in which carefully-calibrated printers may be used to achieve optimum image quality and thereby to establish with a high degree of accuracy the aim densitometric and calorimetric values that define an ideal state of calibration.

The printer 302 also includes a color corrector 318 that generates the printer LUT 303 based on the desired tonescale 311, goal color values 326, remapped test digits 305b, and color measurements 312 (step 210). On subsequent print jobs, the print engine 306 may use the updated LUT 303 to produce printed output 322 having improved color characteristics (step 214).

The printed calibration image 308 may be printed after each print job or after each of a plurality of print jobs (step 202). The region 174 in which the printed calibration image 308 is printed may include both the printed calibration image 308 and a second calibration image (not shown) that may be used to perform color misregistration correction, as described in more detail in the above-referenced patent application entitled "Printer Color Registration Correction." In one embodiment of the present invention, the region 174 is 4"×6" to accommodate both such calibration images. The region 174 may be removed by the cutter 148 after colors are measured in the printed calibration image 308.

Figure 4:
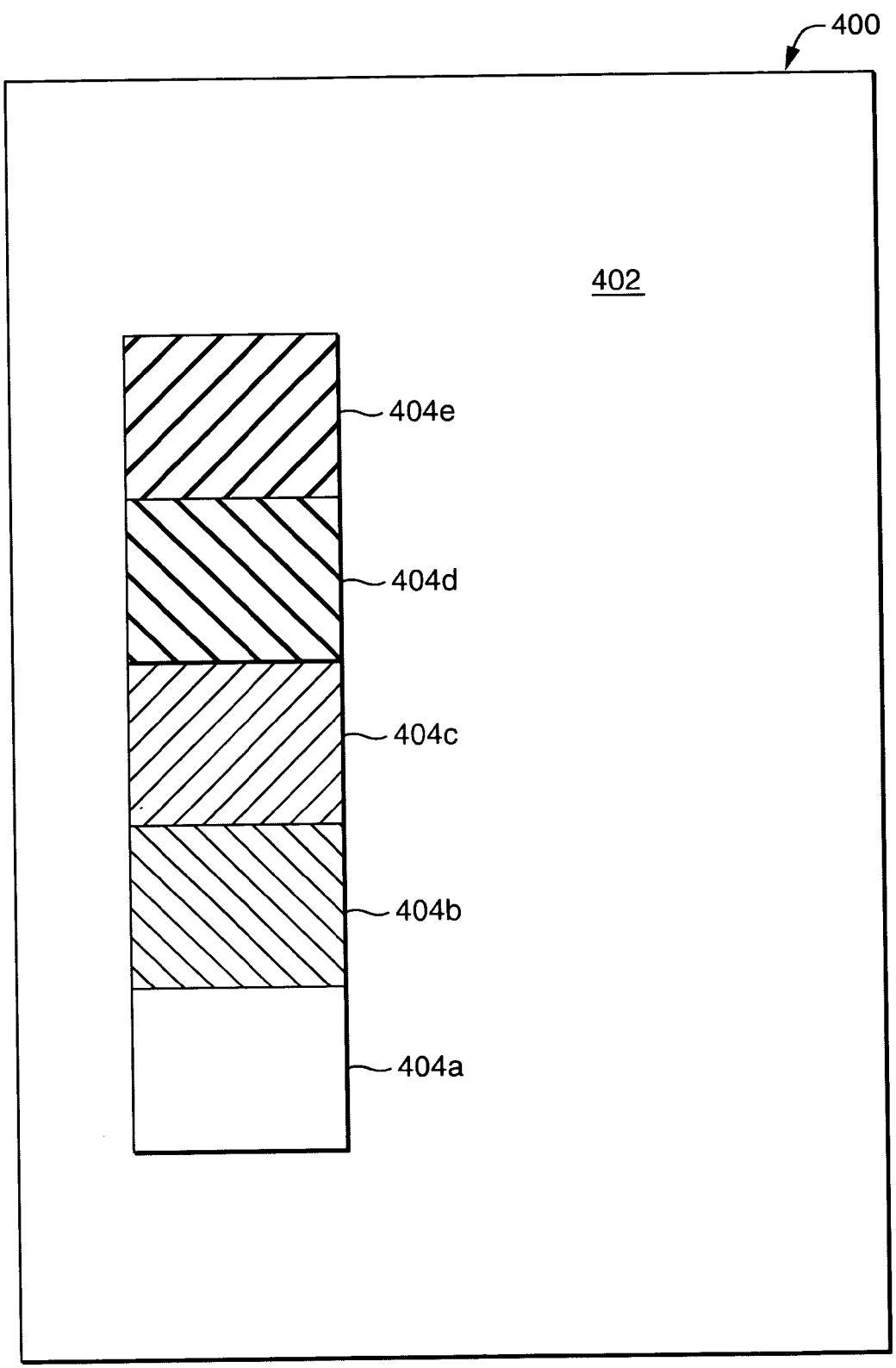
FIG. 4 is a diagram of a portion of a printed calibration image that is used to perform color correction according to one embodiment of the present invention.

Referring to FIG. 4, a target 400 (calibration image) is illustrated according to one embodiment of the present invention. The target 400 is an example of the RGB calibration image 324. The target 400 includes a set of five squares 404a–e ranging in density from a very light shade of gray (square 404a) to a very dark shade of gray (square 404e). For each of the RGB pixels in the squares 404a–e, R=G=B. For example, the RGB values of the squares 404a–e may be (255, 255, 255), (192, 192, 192), (128,128, 128), (64,64,64), and (0,0,0), respectively. As a result, if the print engine 306 were perfectly calibrated, each of the squares 404a–e would be printed as a corresponding distinct shade of gray. In one embodiment of the present invention, each of the squares 404a–e is approximately 1.0"×0.75" when printed in the printed calibration image 308. Although the squares 404a–e in FIG. 4 are arranged in a column, the squares 404a–e may be arranged in other configurations, such as in a two-dimensional grid.

The background 402 of the target is also a shade of gray that differs from the shade of any of the squares 404a–e. The L*, a*, and b* values that should result when the target 400 is printed (thereby producing the printed calibration image 308) may be identified by reference to the goal color values 326.

As described above, colors in the printed calibration image 308 are measured by the color measurement device 310 (e.g., the scanner 172). The color measurement device 310 may perform densitometric measurements, calorimetric measurements, or both. Colorimetric measurements may, for example, be measured in an L*, a*, and b* space.

Although the color measurement device 310 may measure colors in the entire printed calibration image 308 each time the printed calibration image 308 is printed, this is not a requirement of the present invention. For example, in one embodiment of the present invention, the printed calibration image 308 is printed upon completion of each print job, but the color measurement device 310 measures colors (e.g., scans) in only a portion of each printed calibration image 308 that is printed. The color measurement device 310 may, for example, measure colors in square 404a in a first printed calibration image, measure colors in square 404b in a second printed calibration image, and so on. At the end of five print jobs, the color measurement device 310 will have measured colors in all of the squares 404a–e in a round-robin fashion. The remainder of the color correction method 200 (e.g., steps 206–212) may commence once colors have been measured in all of the squares 404a–e in the printed calibration image 308 in this way. The color measurement device 310 may then begin to repeat the image color measurement process by measuring colors in square 404a in the next printed calibration image.

Figure 5:
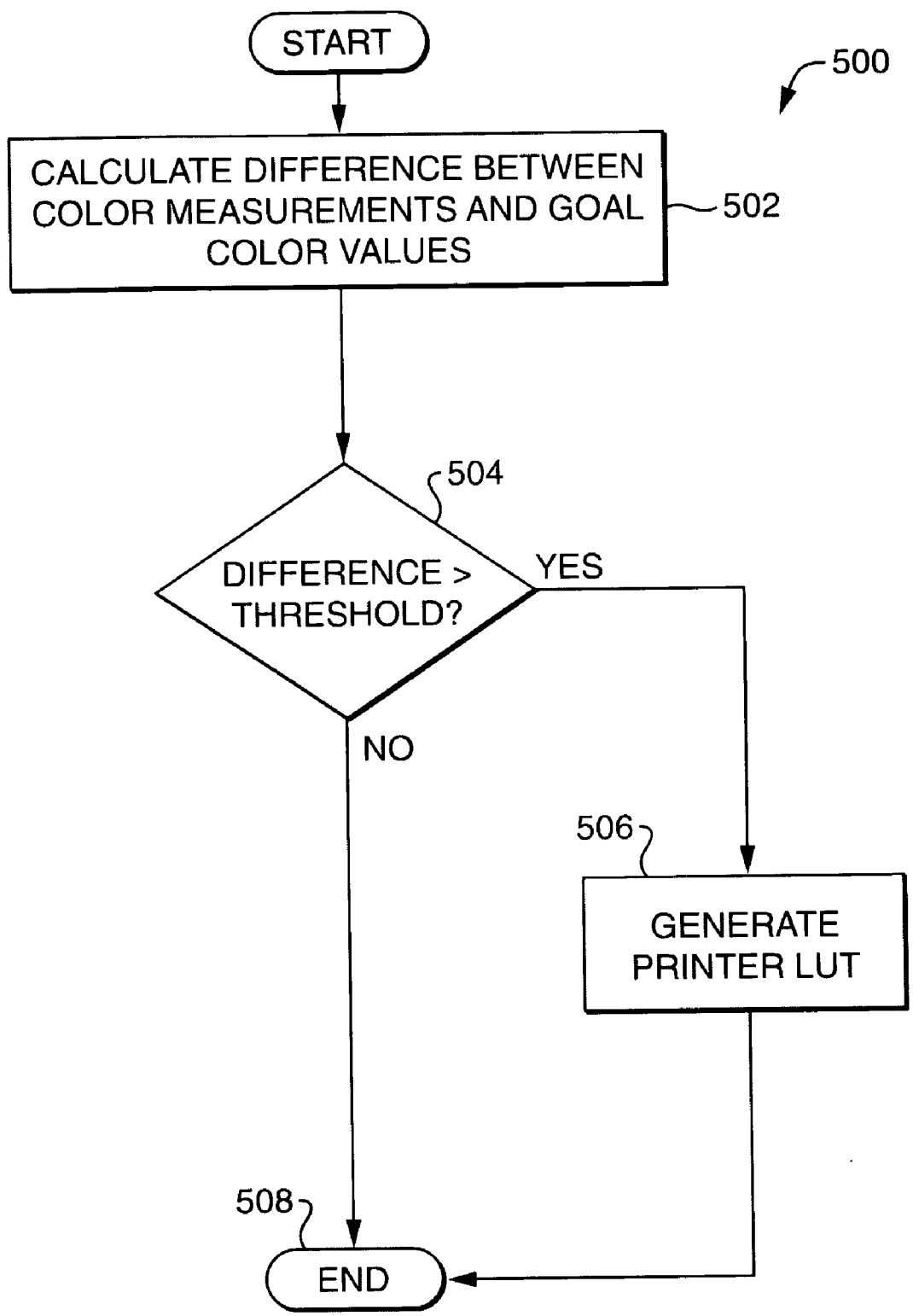
FIG. 5 is a flowchart of a method for determining whether to apply color corrections according to one embodiment of the present invention.

As described above, the LUT 303 may be generated by the color corrector 318. LUT 303, however, need not be generated every time the color measurements 312 are generated. Rather, referring to FIG. 5, a flowchart is shown of a method 500 that is performed by the color corrector 318 in one embodiment of the invention to implement step 212 (FIG. 2) in a way that only generates the LUT 303 when the difference between the color measurements 312 and the goal color values 326 is sufficiently large.

The color corrector 318 calculates the difference (also referred to herein as the "color error") between the color measurements 312 and the goal color values 326 (step 502). The color error may, for example, be an average difference or some other aggregate measure of difference between the color measurements 312 and the goal color values 326. The color corrector 318 determines whether the color error calculated in step 502 exceed a predetermined color error threshold (step 504). If the color error does not exceed the predetermined color error threshold, the method 500 terminates (step 508).

If the color error exceeds the predetermined color error threshold, the method 500 generates the printer LUT 303 (step 506). Alternatively, performance of step 210 may be deferred until the method 500 determines that the color error exceeds the color error threshold, at which time the method 500 may generate printer LUT 303 in step 506 based on the color error. In one embodiment of the present invention, the color error threshold applied in step 504 is $\Delta L^*=9$, $\Delta a^*=6$, and $\Delta b^*=6$, all measured as deviations from the goal color values 326.

These particular thresholds are provided merely for purposes of example and do not constitute limitations of the present invention. Furthermore, more than one set of thresholds may be used. For example, a distinct set of thresholds may be used for each of the tones represented by the squares 404a–e in the target (FIG. 4).

Having described the operation of the system 300 (FIG. 3) in general, examples will now be described of particular techniques for generating the printer LUT 303 (step 210).

Figure 6:
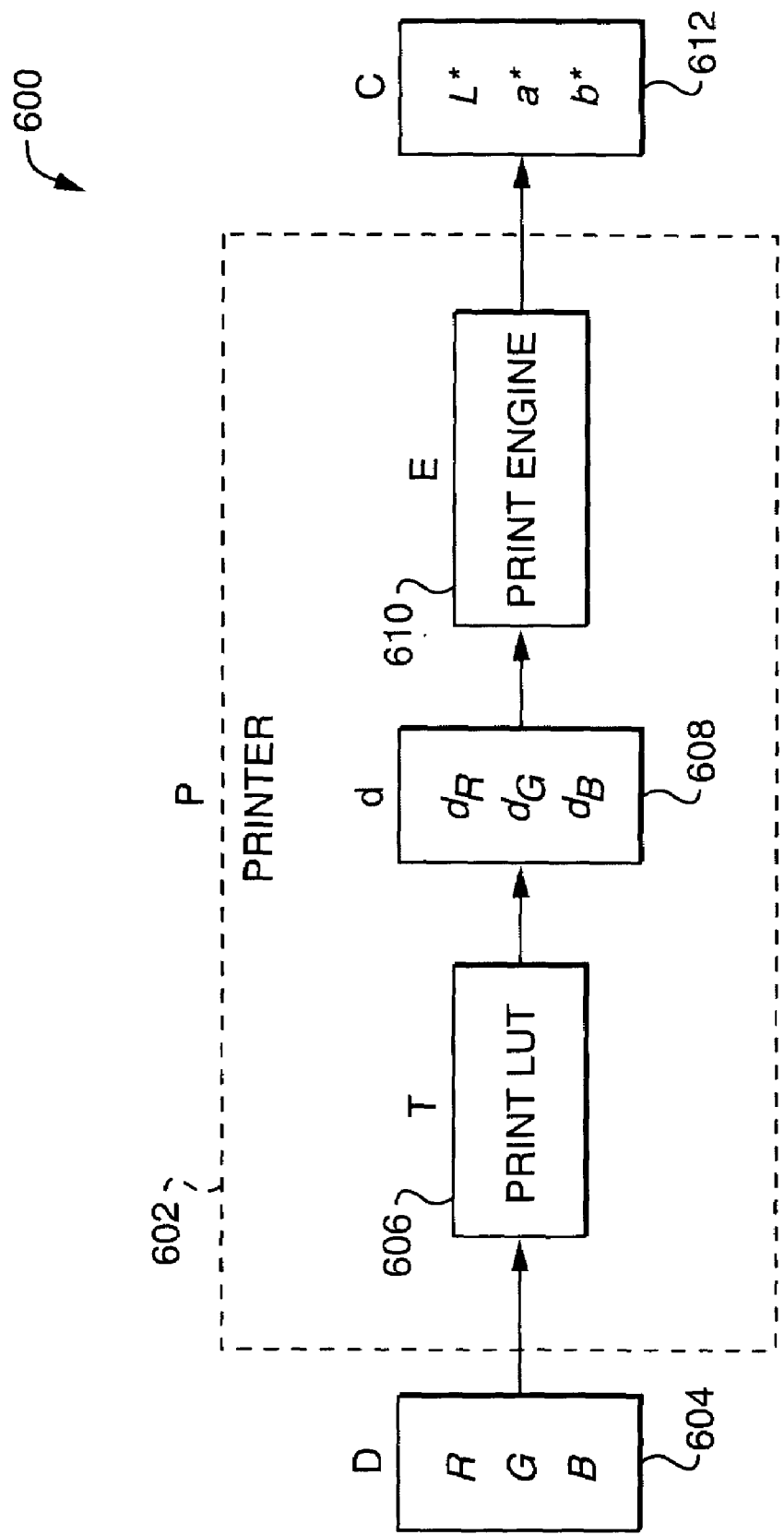
FIG. 6 is a functional block diagram of a system for printing digital information according to one embodiment of the present invention.

Referring to FIG. 6, a functional block diagram is shown of a system 600 for printing digital information. The system 600 includes a printer model 602 that includes a print engine 610. The printer model 602 may, for example, model the printer 302. The printer model 602 may, therefore, be referred to herein either as a "printer model" or simply as a "printer." In FIG. 6 and the corresponding description, bold letters denote matrices/vectors, while non-bold letters denote scalar values.

The printer 602 receives a digital color image as an input and produces a color image as an output. The input image may be represented as a set of one-dimensional vectors, each of which represents a region in the image that has the same red, green, and blue (RGB) components. In FIG. 6, one such input vector D 604 is shown that includes R, G, and B components.

The printer 602 prints a region based on the input vector D 604. The color of the output patch thereby produced may be measured as an (L*, a*, b*) triplet, illustrated in FIG. 6 by an output vector C 612. A function P(·) (referred to as the "tonescale" of the printer 602) relates the printer's input digits (e.g., vector 604) to output colors (e.g., vector 612).

As illustrated in FIG. 6, the print engine 610 does not print output based directly on the printer's input 604. Rather, the printer 602 includes a transform T(·) 606, typically implemented in a lookup table and therefore referred to herein as a "printer LUT," which converts the input (R, G, B) triplet 604 into a density request d 608 that is transformed by the print engine 610 (represented by the function E(·)) into printed output having a measured color represented by vector C 612.

The LUT 606 serves a dual purpose. First, it allows the interpretation of the input digit 604 to be changed with respect to the output color 612 to produce the output colors that are desired. Second, it allows variability to be removed from print engine to print engine so that the same (R, G, B) triplet always produces the same output color.

To summarize, input vector D 604 is provided as input to printer 602. Printer LUT T(·) 606 transforms input vector D 604 into density request d 608. Based on density request d 608, print engine E(·) 610 produces printed output having measured color C 612.

Examples of techniques will now be described for performing color calibration according to one embodiment of the present invention. The "neutral axis" of the input RGB color space (i.e., the color space in which the input vector 604 is defined) is defined as the set of (R, G, B) triplets for which R=G=B. Let $U=[1,1,1]^T$ denote a unit vector that serves as a basis for the neutral axis. Then D=DU, $\forall D=\{0, \ldots, 255\}$, spans the neutral axis. Let $P_g(DU)$, as defined in Equation 1, denote the desired (goal) color response of the printer 602 on the neutral axis.

$$P_g(DU) = \begin{bmatrix} L_g^* \\ a_g^* \\ b_g^* \end{bmatrix} \quad \text{Equation 1}$$

The desired tonescale 311 may be generated in any manner, such as by empirical testing using precisely-calibrated printers under controlled laboratory conditions, thereby defining the function $P_g(DU)$. The function $P_g(DU)$ represents the desired tonescale 311 in the printer 302 illustrated in FIG. 3.

As used herein, the term "1-D color calibration" refers to estimating a transformation T(D), as defined in Equation 2, such that a particular printer response (tonescale) $P(DU)=P_g(DU)$. Note that since this constraint is placed only on the neutral axis, it allows the general 3-D transformation T(·) to be reduced to three 1-D transformations.

$$d = T(D) = \begin{bmatrix} T_R(R) \\ T_G(G) \\ T_B(B) \end{bmatrix} \quad \text{Equation 2}$$

In order to estimate the printer LUT T(·) that will calibrate the printer 602 to have the desired response $P_g(DU)$, we need to model the inverse print engine model, also referred to as the "inverse model, which is defined as $d=E^{-1}(C)$. Typically $E^-(·)$ will be a non-linear function. A Taylor series expansion of this function about a fixed point $C_0$ is indicated by Equation 3.

$$d = E^{-1}(C_0) + \frac{\partial E^{-1}(C_0)}{\partial C}(C - C_0) + L \text{ (higher order terms)} \quad \text{Equation 3}$$

$$\approx \left( E^{-1}(C_0) - \frac{\partial E^{-1}(C_0)}{\partial C} C_0 \right) + \frac{\partial E^{-1}(C_0)}{\partial C} C$$

$$= G(C_0) \begin{bmatrix} 1 \\ C \end{bmatrix}$$

$G(C_0)$ is the inverse model matrix and is given by Equation 4.

$$G(C_0) = \left[ E^{-1}(C_0) - \frac{\partial E^{-1}(C_0)}{\partial C} C_0 \quad \frac{\partial E^{-1}(C_0)}{\partial C} \right] \quad \text{Equation 4}$$

Since the higher-order terms are neglected, the approximation of Equation 3 is only valid if $C_0$ is chosen close to C. If Equation 3 is only evaluated on or close to the neutral axis, $C_0$ may be chosen to be the closest point to C on the neutral response of the printer 602, as shown in Equation 5.

$$C_0 = \operatorname*{argmin}_{X \in \{P_g(DU), \forall D \in [0,255]\}} \|X - C\| \quad \text{Equation 5}$$

In other words, to evaluate the inverse print engine model $E^{-1}(C)$ for a particular C, the goal printer response $P_g(DU)$ may be evaluated for all values of D in the range [0,255] (for 8-bit color spaces) to produce 255 candidates for $C_0$. The distance between each such candidate and C is measured, and the minimum such distance identified. The candidate value having this minimum distance to C is selected as the value for $C_0$.

The inverse model given by Equation 3 is completely determined if $G(C_0)$ is known for all $C_0$. Examples of techniques that may be used to estimate the inverse model matrix $G(C_0)$ at a particular digit D will now be described. To perform this estimation, data samples are collected from the output of the print engine 610 (e.g., in the target 400 shown in FIG. 4) with colors that are in the vicinity of $P_g(DU)$. A color $C_i$ is "in the vicinity of" $P_g(DU)$ if $\|C_i - P_g(DU)\|$ is less than a predetermined threshold value.

Let N be the number of data samples in the vicinity of $P_g(DU)$ with input density requests $d_i$ and measured output color $C_i$, where the subscript i denotes the sample number and i={1,K N}. In one embodiment of the present invention, the matrix G is estimated such that the weighted mean square error between the inverse model (Equation 3) and the observed data (i.e., $C_i$, $\forall i$) is minimized. The weight that each sample receives monotonically decreases with increasing distance from $P_g(DU)$. A Gaussian weighting function may, for example, be employed for this purpose. The weight matrix W is defined as shown in Equation 6.

$$W = \frac{1}{\sum_{i=1}^{N} w(\|C_i - P_g(DU)\|, \sigma)} \quad \text{Equation 6}$$

$$\begin{bmatrix} w(\|C_1 - P_g(DU)\|, \sigma) & 0 & \cdots & 0 \\ 0 & \ddots & \ddots & \vdots \\ \vdots & \ddots & \ddots & 0 \\ 0 & \cdots & 0 & w(\|C_N - P_g(DU), \sigma\|) \end{bmatrix}$$

The Gaussian weighting kernel is defined in Equation 7.

$$w(x, \sigma) = e^{-x^2/\sigma^2} \quad \text{Equation 7}$$

Figure 8:
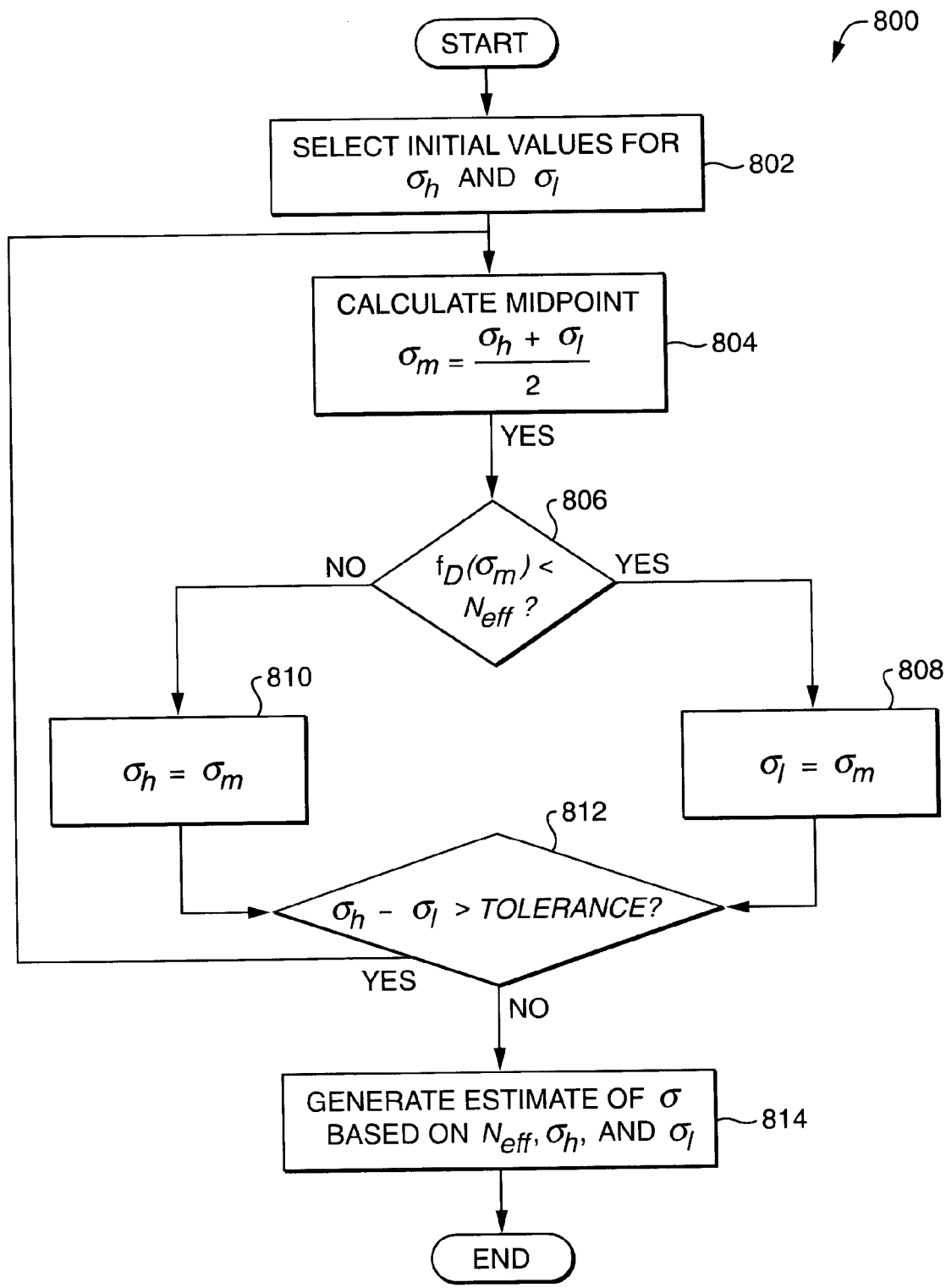
FIG. 8 is a flowchart of a method for selecting a weighting matrix kernel size according to one embodiment of the present invention.

The parameter σ determines the size of the weighting kernel and controls the amount of regularization or smoothness of the estimated tonescale correction function. Techniques that may be used to adaptively estimate the parameter σ are discussed below with respect to FIG. 8.

A Gaussian weighting kernel is merely one example of a weighting kernel that may be used in conjunction with embodiments of the present invention. Furthermore, the parameter σ is merely one example of a regularization parameter that may be used in conjunction with embodiments of the present invention. Other kinds of weighting kernels having other regularization parameters may be used. Another example of a weighting kernel, having regularization parameters ρ and ε, is shown in Equation 8:

$$w(C_1, P_g(DU)) = \frac{1}{\|C_1 - P_g(DU)\|^\rho + \varepsilon} \qquad \text{Equation 8}$$

In one embodiment of the present invention, estimation of G is facilitated by inserting the input density requests $d_i$ and measured output colors $C_i$ into matrices Y and A, as shown in Equation 9 and Equation 10, respectively.

$$Y = [d_1 \ L \ d_N] \qquad \text{Equation 9}$$

$$A = \begin{bmatrix} 1 & L & 1 \\ C_1 & L & C_N \end{bmatrix} \qquad \text{Equation 10}$$

Let $\hat{Y}$ denote the inverse model predictions, as shown in Equation 11.

$$\hat{Y} = G(P_g(DU))A \qquad \text{Equation 11}$$

The weighted mean square error between the inverse model prediction and the data is given by Equation 12.

$$MSE = tr(W(Y-\hat{Y})^T(Y-\hat{Y})), \qquad \text{Equation 12}$$

The notation tr(X) denotes the trace of the matrix X. The inverse model matrix that minimizes the above MSE is given by Equation 13. In one embodiment of the present invention, Equation 13 therefore is used to generate the inverse model matrix.

$$\hat{G}(P_g(DU)) = YWA^T(AWA^T)^{-1} \qquad \text{Equation 13}$$

Figure 7:
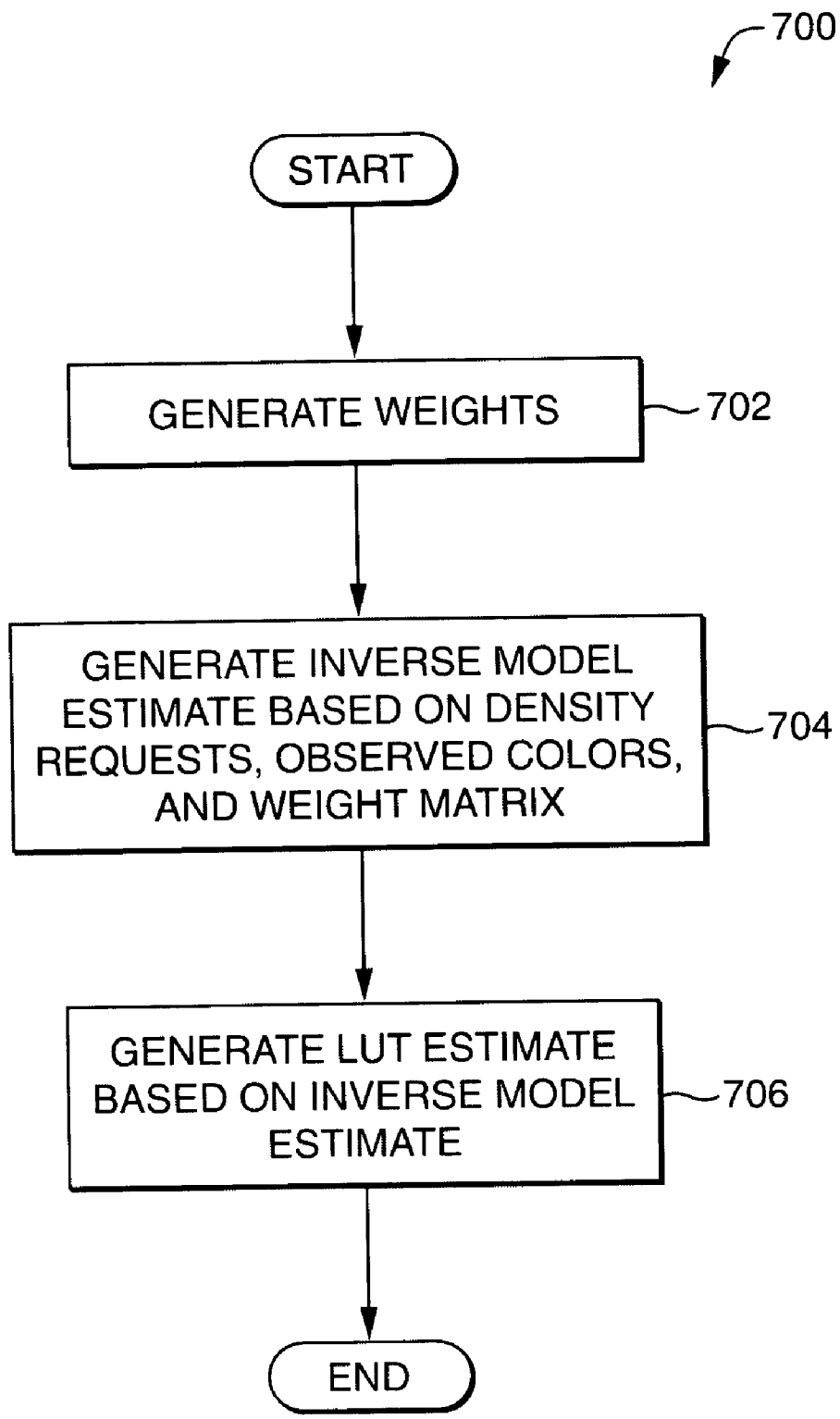
FIG. 7 is a flowchart of a method for generating color corrections for use in color calibration according to one embodiment of the present invention.

Referring to FIG. 7, a flowchart is shown of a method 700 for generating the LUT 303 according to one embodiment of the present invention. The method 700 generates the weight matrix W in accordance with Equation 6 (step 702). The method generates an estimate $\hat{G}$ of the inverse model matrix G based on the density request vector Y, the observed colors matrix A, and the weight matrix W (step 704). The method 700 generates a LUT estimate $\hat{T}$ based on the inverse model matrix estimate $\hat{G}$ (step 706). The LUT estimate $\hat{T}$ may be applied to subsequent print data 304 before such data are provided to the print engine 306. Examples of techniques that may be used to generate the LUT estimate $\hat{T}$ will be described below.

The preceding discussion described how to calculate the inverse model matrix estimate $\hat{G}$ given a particular weighting matrix kernel size σ. Examples of techniques will now be described that may be used to estimate the matrix kernel size σ.

The linear approximation to the inverse model according to Equation 3 is valid only for points close to $C_0$ where the partial derivative matrix $G(C_0)$ is computed. The techniques described above with respect to FIG. 7 estimate G based on points in the vicinity of $C_0 = P_g(DU)$ where points closer to $P_g(DU)$ are given more weight by the weighting matrix (Equation 6) than points further away. The relative weight attached to any sample point is determined by the parameter σ of the weighting kernel (Equation 7).

In one embodiment of the present invention, the accuracy of the estimate $\hat{G}$ is improved by adapting the size σ of the weighting kernel as the neutral axis is traversed. In this embodiment, when there are more samples close to the neutral axis, the weighting matrix shrinks and the estimation of $\hat{G}$ becomes more local and hence more accurate.

Given a particular σ and a particular number of samples N, the "effective" number of samples $N_{\textit{eff}}$ is defined by Equation 14.

$$N_{\textit{eff}} = \sum_{i=1}^{N} w(\|C_i - P_g(DU)\|, \sigma) = f_D(\sigma) \qquad \text{Equation 14}$$

If a sample is located exactly at $P_g(DU)$, its contribution to $N_{\textit{eff}}$ is 1. The further a sample is away from $P_g(DU)$, the lower its contribution to $N_{\textit{eff}}$. The value of σ may be estimated by setting $N_{\textit{eff}}$ to be constant along the neutral axis, as shown in Equation 15.

$$\hat{\sigma}(D) = f_D^{-1}(N_{\textit{eff}}) \qquad \text{Equation 15}$$

In one embodiment of the present invention an iterative method is used to solve Equation 15. For example, referring to FIG. 8, a flowchart is shown of a method 800 that is performed by the color error estimator 314 in one embodiment of the present invention to select a value for the matrix kernel size σ. Since $f_D(\sigma)$ is monotonically increasing with respect to σ, a half-interval search is used to solve Equation 15 and therefore to produce an estimate $\hat{\sigma}(D)$ for σ as follows.

The method selects initial values for $\sigma_h$ and $\sigma_l$ such that $f_D(\sigma_l) < N_{\textit{eff}} < f_D(\sigma_h)$ (step 802). The method 800 calculates the midpoint $\sigma_m$ between $\sigma_h$ and $\sigma_l$ using the formula $\sigma_m = (\sigma_h + \sigma_l)/2$ (step 804). The method 800 determines whether $f_D(\sigma_m) < N_{\textit{eff}}$ (step 806). If it is, the method 800 assigns the value of $\sigma_m$ to $\sigma_l$ (step 808); otherwise, the method 800 assigns the value of $\sigma_m$ to $\sigma_h$ (step 810).

The method 800 determines whether the difference between $\sigma_h$ and $\sigma_l$ is less than a predetermined tolerance (step 812). If it is not, the method 800 returns to step 804 and repeats steps 804-810 until the difference between $\sigma_h$ and $\sigma_l$ is less than the predetermined tolerance. If the difference between $\sigma_h$ and $\sigma_l$ is less than the predetermined tolerance, the method 800 generates an estimate $\hat{\sigma}$ of σ according to Equation 16 (step 814).

$$\hat{\sigma}(D) = \sigma_l + (N_{\textit{eff}} - f_D(\sigma_l)) \frac{f_D(\sigma_h) - f_D(\sigma_l)}{\sigma_h - \sigma_l} \qquad \text{Equation 16}$$

In brief, steps 804-810 try to box in the solution by halving the interval that encompasses the solution to Equation 15 at each iteration. When the solution interval is small enough (less than the predetermined tolerance) such that $f_D(\sigma)$ can be accurately modeled via a linear approximation, step 814 (Equation 16) computes the final solution using the linear approximation.

Given data samples $C_i$ collected from the print engine 306 in the vicinity of the desired neutral response, the inverse model matrix $\hat{G}$ is first computed using the procedure described above with respect to FIG. 7. The inverse model (Equation 3) is then evaluated at all points on the neutral axis, as shown in Equation 17.

$$\hat{d}(D) = \hat{G}(P_g(DU)) \begin{bmatrix} 1 \\ P_g(DU) \end{bmatrix} \qquad \text{Equation 17}$$

Since $\hat{d}(D)$ denotes the density requests to the print engine that are estimated to result in the desired neutral response $P_g(DU)$ at digit D, it follows that the printer LUT for each input color (R, G or B) is estimated in one embodiment of the present invention (FIG. 7, step 706) using Equation 18.

$$\hat{T}_R(D) = \hat{d}_R(D)$$

$$\hat{T}_G(D) = \hat{d}_G(D), \forall D = \{0, \ldots 255\}$$

$$\hat{T}_B(D) = \hat{d}_B(D) \qquad \text{Equation 18}$$

The method just described for estimating the printer LUT works best when $\hat{G}$ can be estimated accurately at all points on the neutral axis. When the data is limited and $\hat{G}$ can only be accurately estimated at a selected number of points on the neutral axis, the above procedure may be modified to evaluate Equation 17 and Equation 18 at a subset of points on the neutral axis. $\hat{T}(\cdot)$ may then be interpolated smoothly to fill in the missing points to obtain the final estimate at all the points on the neutral axis.

Figure 9:
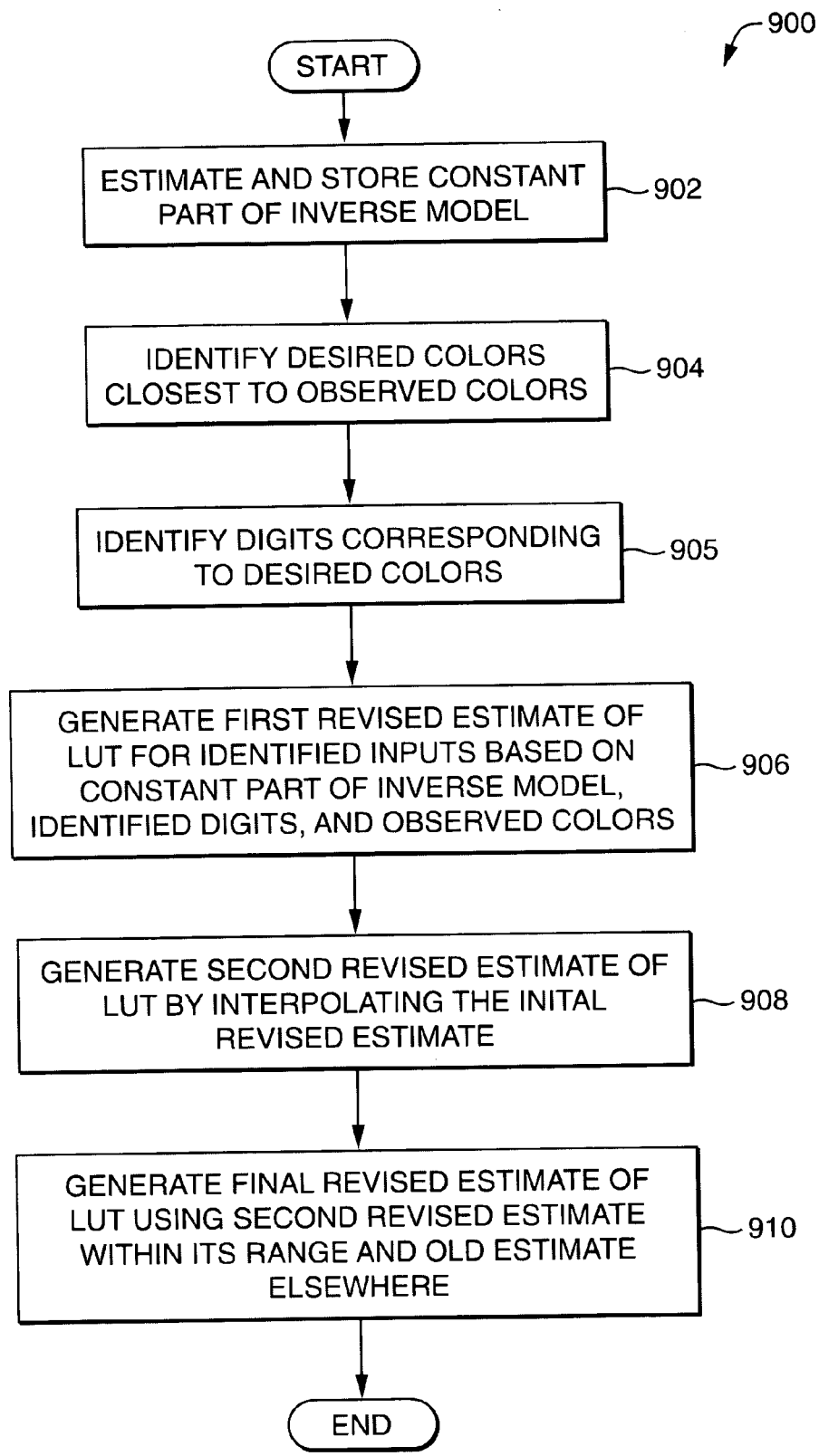
FIG. 9 is a flowchart of a method for modifying printer lookup tables according to one embodiment of the present invention.

The preceding discussion assumes a large number of samples are available from which to estimate the inverse model matrix $\hat{G}$. It might not, however, be possible to collect a large number of samples every time the printer 302 needs to be calibrated in the field due to time or cost limitations. Referring to FIG. 9, a flowchart is shown of a method 900 that may be performed by the color corrector 318 to generate a correction to the current printer LUT 606 given only a limited number of samples.

Consider the model indicated by Equation 3. In the event that only $E(\cdot)$ changes over time but the partial derivatives of the print engine 306 with respect to its inputs, $\partial E/\partial d$, remain constant on or close to the neutral axis, the inverse partial derivative matrix $\partial E^{-1}(\cdot)/\partial C$ could be estimated off-line and stored for subsequent use (step 902). The first component of $\hat{G}$, as shown in Equation 4, may be variable with time and may therefore be discarded. Examples of techniques will now be described for estimating this first component of $\hat{G}$ from a sparse sample set.

Let N be the (small) number of samples printed by the printer 302. Let $d_i$ and $C_i$ denote the input density request and output measured color of the $i^{th}$ sample. Let $D_i$ denote the digit (RGB triplet) at which the desired response $P_g(D_iU)$ is closest to $C_i$. The method 900 may identify the desired response $P_g(D_iU)$ that is closest to $C_i$ (step 904) and then identify the input digit $D_i$ using Equation 19 (step 905).

$$D_i = \underset{D \in \{0, K\,255\}}{\operatorname{argmin}} \|P_g(DU) - C_i\|. \qquad \text{Equation 19}$$

It follows from Equation 3 and Equation 18 that a first refined estimate of the printer LUT may be obtained using Equation 20 (step 906).

$$\hat{T}(D_i) = d_i + \frac{\partial \hat{E}^{-1}(P_g(D_iU))}{\partial C}(P_g(D_iU) - C_i) \qquad \text{Equation 20}$$

$i = \{1, K, N\}.$

Note that Equation 19 could yield the same digit D for multiple data points. This would happen when multiple data points $C_i$ are closest to the same point on the desired neutral response. In this case, multiple estimates of the printer LUT given by Equation 20 may be obtained at the repeated digit. All of these estimates may be averaged to produce a single estimate at the repeated digit.

Printer LUT estimates at digits obtained from a single measurement sample might also be susceptible to noise. This would result in a noisy (rough) tonescale and could potentially degrade the performance of the printer 302 rather than improving it. To combat this problem, one might reduce noise by clustering the original estimate into small groups and then averaging the multiple LUT estimates and digits in each group to yield a single estimate at the average digit. This reduction of noise comes at the expense of the reducing the resolution of the estimated LUT. A second revised estimate of the LUT on the entire neutral axis may then be obtained by smoothly interpolating the sparse estimate given by Equation 20 with or without the post noise reduction (step 908).

If $D_i$, $i = \{1, K\,N\}$, does not span the entire digit range, the LUT on the entire neutral axis could be obtained by extrapolation. In one embodiment of the present invention, however, the LUT on the entire neutral axis is obtained by a technique other than extrapolation. In particular, the previous best estimate of the LUT ($\hat{T}_{old}(\cdot)$) is used outside the range not covered by the measurements (step 910). The new LUT estimate is therefore represented by Equation 21.

$$\hat{T}_{new}(D) = \begin{cases} \hat{T}_{old}(D), & D < \min(D_i), D > \max(D_i) \\ I(D)\hat{T}(D_i), & \min(D_i) \leq D \leq \max(D_i) \end{cases} \qquad \text{Equation 21}$$

$I(D)$ is the interpolation operator matrix to obtain the estimate at digit D from the isolated LUT estimates at digits $D_i$.

In the examples provided above, data samples are collected close to the desired neutral response of the printer. This is easy to do for a calibrated printer or a printer that has drifted only slightly from its calibrated state since equal digit input will produce something close to the neutral response. If, however, the printer 302 has drifted significantly from its calibrated state or when the printer 302 is calibrated for the first time, it may not be feasible to collect samples that are close to the printer's desired neutral response.

Figure 10:
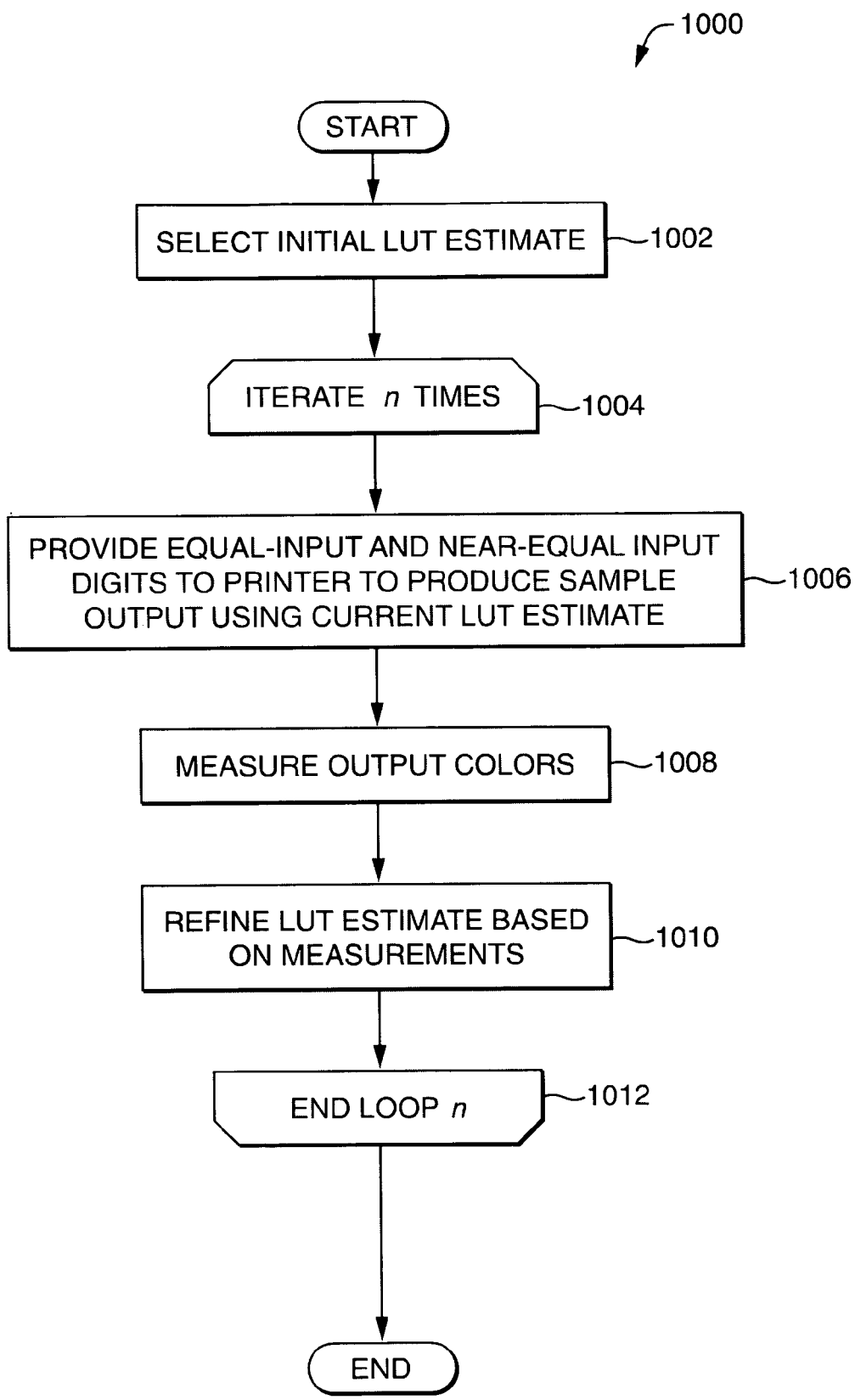
FIG. 10 is a flowchart of a method for refining the tonescale of a printer according to one embodiment of the present invention.

In one embodiment of the present invention, this "chicken and egg" problem is addressed by iteratively refining the LUT estimate $\hat{T}(\cdot)$. Referring to FIG. 10, a flowchart is shown of a method 1000 that may be performed by the color corrector to perform such iterative refinement according to one embodiment of the present invention. Initially, when no LUT estimate has yet been generated, an initial guess is generated for the LUT (step 1002). The method 1000 then enters a loop that is performed n times, wherein n is selected so that n iterations of the process to be described is expected to produce sufficient refinement of the LUT estimate $\hat{T}(\cdot)$ (step 1004).

Data samples are then generated by probing the printer 302 with equal input digit samples (i.e., digits in which R=G=B) and other samples surrounding these equal digit samples using the current estimate of the LUT (step 1006). The choice of how far the surrounding samples should be from the equal digit samples depends on how far we think the printer is from its calibrated state.

The method 1000 measures the colors in the data samples generated by step 1006 (step 1008). The data collected are stored as input-density and output-color pairs and not as input-digit and output-color pairs. The former method allows the data collected in any particular iteration to be reused in all subsequent iterations since the data in this format represents the portion of the response of the print engine 306 that is invariant to the particular selection of the LUT 606. This invariance is desirable since the LUT 606 will change from iteration to iteration until it converges to the desired values.

The data collected from the initial guess might not be very close to the desired neutral response. This data is used to obtain a new estimate of the LUT 606 using either Equation 18 (if the number of samples is large) or Equation 20 or Equation 21 (when the number of samples is limited) (step 1010). Note that since the linear approximation of the inverse print engine (Equation 3) is accurate only in a local region, the accuracy of the estimated LUT would be questionable since the data samples are located far away from the desired neutral response. However, if the new LUT brings the printer closer to having the desired tonescale of the printer, repeating the data collection process using the new LUT would yield samples closer to the desired neutral response. This data in combination with the previously collected data is then used to obtain a better estimate of the LUT 606. Steps 1006–1010 are repeated (step 1012) until a sufficiently accurate estimate of the desired LUT is generated, at which time the method 1000 terminates (step 1014). The current value of the LUT estimate produced by the method 1000 may then be used as the LUT 303 to calibrate the printer 302.

Figure 11:
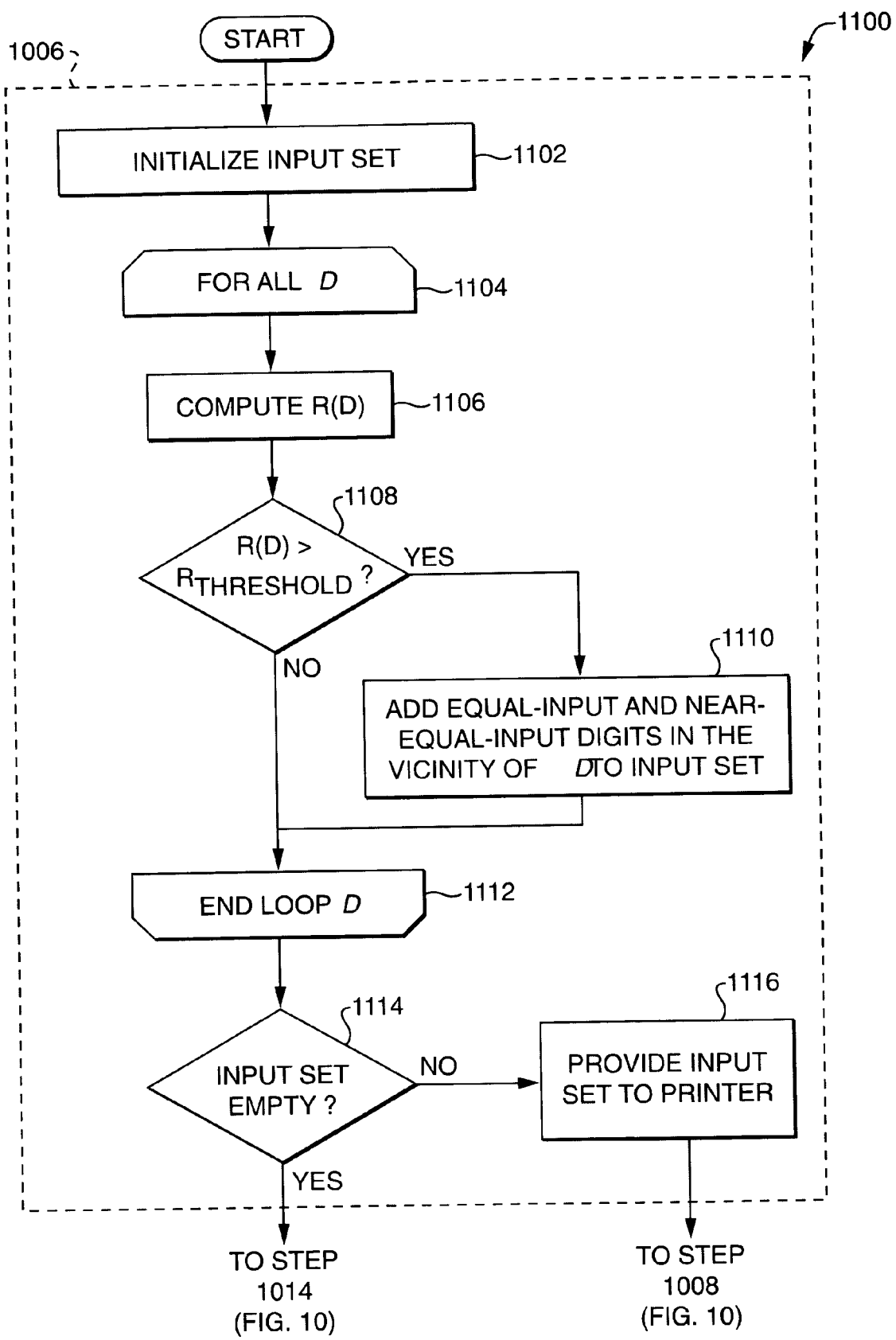
FIG. 11 is a flowchart of a method for adaptively generating color data samples for use in color calibration according to one embodiment of the present invention.

To reduce the number of samples printed and measured in any iteration, in one embodiment of the present invention new sample generation is triggered only in regions where the data collected in the previous iterations are not close to the desired neutral response. Referring to FIG. 11, a flowchart is shown of a method 1100 that is performed in one embodiment of the present invention to generate new samples only when appropriate. The method 1100 may, for example, be used to implement step 1006 of method 1000 (FIG. 10). The method 1100 initializes an empty set of input digits (step 1102).

Let the measure of average distance of the data to the desired neutral response at digit D be defined by Equation 22.

$$R(D) = \frac{\sum_{i=1}^{N(D)} w(\|C_i - P_g(DU)\|, \hat{\sigma}(D)) \|C_i - P_g(DU)\|}{\sum_{i=1}^{N(D)} w(\|C_i - P_g(DU)\|, \hat{\sigma}(D))},$$ Equation 22

N(D) is the total number of samples collected in the vicinity of $P_g(DU)$ (defined as the samples that are within a given maximum distance from $P_g(DU)$) and i={1,K, N(D)} denotes the indices of the N(D) samples.

The method 1100 enters a loop over all possible input digits (e.g., all possible (R, G, B) triplets) (step 1104). For each value of D, the method 110 computes R(D) (step 1106) and determines whether $R(D) > R_{threshold}$, where $R_{threshold}$ denotes the average distance within which the linear approximation of the inverse model is accurate (step 1108). If $R(D) > R_{threshold}$, the method 1100 generates equal-input (i.e., R=G=B) and near-equal-input digits in the vicinity of D and adds those inputs to the input set initialized in step 1102 (step 1110). The method 1100 repeats steps 1106–1110 for the remaining values of D (step 1112).

Upon iterating over all values of D, the method 1100 determines whether the input set is empty (step 1114). If the input set is not empty, the method 1100 provides the digits in the input set as inputs to the print engine 306, thereby causing the print engine 306 to produce sample output (e.g., the printed calibration image 308) using the current LUT estimate (step 1116). Colors in the sample output thereby produced may be measured and used to further refine the LUT as described above with respect to FIG. 10. If the input set is empty, no additional sample output is produced and refinement of the LUT is complete (step 1014).

In summary, the method 1100 generates new samples in the vicinity of digit D only if $R(D) > R_{threshold}$. If $R(D) \leq R_{threshold}$, $\forall D$, then no new samples are generated and all the data collected in the previous iterations are sufficient to produce an accurate estimate of the desired LUT.

One advantage of various techniques disclosed herein is that they may be used to perform color correction in a closed-loop system that does not require user intervention. As described above, for example, the printer 302 may automatically print and measure colors in the printed calibration image 308 and perform color calibration based on the color measurements 312 without user intervention. Such a system may not only reduce the amount of manual effort required to calibrate the printer 302, but may also enable the printer 302 to remain in better calibration over time by making it feasible to repeatedly recalibrate the printer due to the lack of necessity for human intervention.

It need not be expensive to equip a printer with such closed-loop calibration capabilities due to the advent of relatively small and inexpensive color-measuring sensors that may be embedded within a printer to implement the color measurement device 310. The added cost incurred by implementing the color measurement device 310 may, however, be counterbalanced by cost savings realized each time that automatic calibration eliminates the need for a costly human service call.

Another advantage of embodiments of the present invention is that the accuracy of the estimate $\hat{G}$ may be improved by adapting the size σ of the weighting kernel as the neutral axis is traversed. Consider the case where the number of measured samples in the vicinity of the neutral axis varies significantly as the neutral axis is traversed. If one chooses the size of the weighting kernel to be large enough to accommodate regions of the neutral axis where the measured samples are far away, the estimation accuracy of $\hat{G}$ would suffer in the regions where the samples are located close to the neutral axis. The adaptive estimation of σ however enables the weighting matrix to shrink selectively in regions where more samples are available close to the neutral axis hence making the estimation of $\hat{G}$ more local and accurate.

A further advantage of embodiments of the present invention is that they may be used to estimate the printer LUT 303 accurately even when the number of samples is limited. As described above, if it is assumed that the derivatives of the forward printer model E(·) are constant over time, such derivatives may be computed off-line and stored for subsequently estimating the printer LUT 303. Even if the number of available samples is limited when the printer LUT is subsequently estimated, the use of the pre-computed derivatives increases the accuracy of the estimation beyond that which would otherwise be possible.

Yet another advantage of embodiments of the present invention is that, by performing color correction in the density space (i.e., the space of the density request d 608) rather than in the input RGB space (i.e., the space of input vector D 604), it becomes possible to merge data from multiple iterations of the printer LUT 606. As a result, data obtained in each iteration may be used to build upon the results obtained in previous iterations and thereby successively refine and improve the estimate of the LUT 606.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The particular print mechanism 100 shown in FIG. 1 is disclosed merely for purposes of example and does not constitute a limitation of the present invention. Other print mechanisms may be used in conjunction with the techniques disclosed herein. For example, the print mechanism 100 may have greater or fewer than four print heads and need not be a thermal transfer printer. The particular resolutions of the print heads 116a–c are provided merely for purposes of example. Furthermore, although in the examples described above each of the print heads 116a–c has a distinct resolution, this is not a requirement of the present invention. In addition, although certain examples described above may refer to thermal printers, the techniques disclosed herein are not limited to use in conjunction with thermal printers, but rather may be used in conjunction with any kind of printer.

The scanner 172 is merely one example of an color measurement device. Other color measurement devices, however, may be used in conjunction with the techniques disclosed herein. Furthermore, the print mechanism 100 may include more than one color measurement device.

The particular features of the calibration image described in the examples above do not constitute limitations of the present invention. For example, the printed calibration image 308 may be any size. The particular target 400 shown in FIG. 4 is shown merely for purposes of example and does not constitute a limitation of the present invention. The target 400 may, for example, include a greater or lesser number of squares than five, and shapes other than squares may be used. Although the squares in 404a–e are neutral (gray) trichrome patches, this is not required. The target 400 may, for example, include monochrome patches that each consist of a single colorant printed by one of the print heads 116a–c.

As described above, colors in the printed calibration image 308 may be measured densitometrically or calorimetrically. In one embodiment of the present invention, monochrome patches in the printed calibration image 308 are measured densitometrically while trichrome patches are measured calorimetrically.

Although the goal color values 326 are described herein as a set of output L*, a*, and b* values, more generally the goal color values 326 may represent any function relating input densities to output intensities. The goal color values 326 may, therefore, include not only a set of expected output values for a set of fixed inputs, but also define the relationship between inputs and expected outputs in any way, such as by a mathematical formula, algorithm, or lookup table.

Although elements 303 (FIG. 3) and 606 (FIG. 6) are described herein as "lookup tables," the functions performed by elements 303 and 606 need not be implemented in lookup tables. Rather, elements 303 and 606 represent printer tonescale correction functions that may be implemented in any kind of hardware, software, firmware, or combination thereof for performing the functions described herein.

The term "density value," as used herein, includes any value measured by a densitometer, calorimeter, spectrophotometer, or other measurement device, and to any values having a one-to-one correspondence with such measured values. The component values of the input vector D 604, the density request d 608, and the output vector C 612 are all examples of "density values" as that term is used herein.

The techniques described above may be implemented, for example, in hardware, software, firmware, or any combination thereof. For example, the methods illustrated in FIGS. 2, 5, and 7–11 may be implemented in software executing on a processor within the printer 302. Operation of components of the printer 302, including the print mechanism 100, may be controlled in whole or in part by such software.

More generally, the techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for generating a printer tonescale correction function for use in conjunction with a printer including a print engine, the method comprising steps of:
   (A) identifying a plurality of goal color values;
   (B) identifying a first plurality of density values provided to the print engine to produce a first printed image;
   (C) identifying a plurality of measured color values in the first printed image;
   (D) selecting a plurality of weights associated with the plurality of measured color values, wherein the plurality of weights are defined according to a Gaussian weighting function that weights each of the plurality of measured color values $C_i$ based on a distance between $C_i$ and a corresponding one of the goal color values;
   (E) selecting an inverse model of the print engine based on the first plurality of density values, the plurality of measured color values, and the plurality of weights; and
   (F) generating the printer tonescale correction function based on the inverse model.

2. The method of claim 1, further comprising a step of:
   (G) applying the printer tonescale correction function to a digital image to produce a second plurality of density values; and
   (H) providing the second plurality of density values to the print engine to produce a second printed image.

3. The method of claim 1, wherein the weight of each of the plurality of measured color values $C_i$ is proportional to $w(\|C_i - P_g(DU)\|, \sigma)$, wherein $P_g(DU)$ comprises the corresponding one of the plurality of goal color values, and wherein $w(x,\sigma) = e^{-x^2/\sigma^2}$.

4. The method of claim 1, wherein the inverse model comprises an inverse model matrix $\hat{G}$ as shown in the following equation:

$$\hat{G}(P_g(DU)) = YWA^T(AWA^T)^{-1},$$

wherein $P_g(DU)$ comprises one of the plurality of goal color values, wherein N is a number of samples in the first printed image, wherein $i = \{1, \ldots N\}$, wherein $d_i$ designates the ith one of the plurality of density values, wherein $C_i$ designates the ith one of the plurality of measured color values, wherein $$Y = [d_1 \quad L \quad d_N], \text{ wherein}$$

$$A = \begin{bmatrix} 1 & L & 1 \\ C_1 & L & C_N \end{bmatrix}, \text{ and wherein}$$

$$\hat{Y} = G(P_g(DU))A.$$

5. The method of claim 1, wherein the step (D) comprises a step of selecting the plurality of weights based on the plurality of measured color values and the plurality of goal color values.

6. A device for generating a printer tonescale correction function for use in conjunction with a printer including a print engine, the device comprising:
   first identification means for identifying a plurality of goal color values;
   second identification means for identifying a first plurality of density values provided to the print engine to produce a first printed image;
   third identification means for identifying a plurality of measured color values in the first printed image;
   first selection means for selecting a plurality of weights associated with the plurality of measured color values, wherein the plurality of weights are defined according to a Gaussian weighting function that weights each of the plurality of measured color values $C_i$ based on a distance between $C_i$ and a corresponding one of the goal color values;
   second selection means for selecting an inverse model of the print engine based on the first plurality of density values, the plurality of measured color values, and the plurality of weights; and
   means for regenerating the printer tonescale correction function based on the inverse model.

7. The device of claim 6, further comprising:
   means for applying the printer tonescale correction function to a digital image to produce a second plurality of density values; and
   means for providing the second plurality of density values to the print engine to produce a second printed image.

8. The device of claim 6, wherein the weight of each of the plurality of measured color values $C_i$ is proportional to $w(\|C_i - P_g(DU)\|, \sigma)$, wherein $P_g(DU)$ comprises the corresponding one of the plurality of goal color values, and wherein $w(x,\sigma) = e^{-x^2/\sigma^2}$.

9. The device of claim 6, wherein the inverse model comprises an inverse model matrix $\hat{G}$ as shown in the following equation:

$$\hat{G}(P_g(DU)) = YWA^T(AWA^T)^{-1},$$

wherein $P_g(DU)$ comprises one of the plurality of goal color values, wherein N is a number of samples in the first printed image, wherein $i = \{1, \ldots N\}$, wherein $d_i$ designates the ith one of the plurality of density values, wherein $C_i$ designates the ith one of the plurality of measured color values, wherein $$Y = [d_1 \quad L \quad d_N], \text{ wherein}$$

$$A = \begin{bmatrix} 1 & L & 1 \\ C_1 & L & C_N \end{bmatrix}, \text{ and wherein}$$

$$\hat{Y} = G(P_g(DU))A.$$

10. The device of claim 6, wherein the first selection means comprises means for selecting the plurality of weights based on the plurality of measured color values and the plurality of goal color values.

11. A computer-implemented method for selecting a value $\sigma$ for use as a weighting kernel size in a Gaussian weighting function for weighting a plurality of color samples in a printer color calibration process, the method comprising steps of:
   (A) selecting initial values for variables $\sigma_l$ and $\sigma_h$;
   (B) assigning the mean of $\sigma_l$ and $\sigma_h$ to a variable $\sigma_m$;
   (C) determining whether $f_D(\sigma_m) < N_{eff}$, wherein $$N_{\mathit{eff}} = \sum_{i=1}^{N} w(\|C_i - P_g(DU)\|, \sigma) = f_D(\sigma),$$

wherein $w(x,\sigma)=e^{-x^2/\sigma^2}$, wherein N is the number of the plurality of color samples, wherein $C_i$ is the ith one of the plurality of color samples, and wherein $P_g(DU)$ comprises a goal color value corresponding to an input digit D;
  (D) if $f_D(\sigma_m)<N_{\mathit{eff}}$, assigning the value of $\sigma_m$ to $\sigma_l$;
  (E) if $f_D(\sigma_m)<N_{\mathit{eff}}$, assigning the value of $\sigma_m$ to $\sigma_h$;
  (F) if $\sigma_h-\sigma_l$ is greater than a predetermined tolerance, returning to step (B);
  (G) otherwise, selecting a value for $\sigma$ based on the values of $N_{\mathit{eff}}$, $\sigma_l$, and $\sigma_h$.

12. The method of claim 11, wherein step (G) comprises a step of selecting a value for $\sigma$ using the equation:

$$\sigma(D) = \sigma_l + (N_{\mathit{eff}} - f_D(\sigma_l))\frac{f_D(\sigma_h) - f_D(\sigma_l)}{\sigma_h - \sigma_l}.$$

13. A device for selecting a value $\sigma$ for use as a weighting kernel size in a Gaussian weighting function for weighting a plurality of color samples in a printer color calibration process, the device comprising:
  means for selecting initial values for variables $\sigma_l$, and $\sigma_h$;
  assignment means for assigning the mean of $\sigma_l$ and $\sigma_h$ to a variable $\sigma_m$;
  means for determining whether $f_D(\sigma_m)<N_{\mathit{eff}}$, wherein $$N_{\mathit{eff}} = \sum_{i=1}^{N} w(\|C_i - P_g(DU)\|, \sigma) = f_D(\sigma),$$

wherein $w(x,\sigma)=e^{-x^2/\sigma^2}$, wherein N is the number of the plurality of color samples, wherein $C_i$ is the ith one of the plurality of color samples, and wherein $P_g(DU)$ comprises a goal color value corresponding to an input digit D;
  means for assigning the value of $\sigma_m$ to $\sigma_l$ if $f_D(\sigma_m)<N_{\mathit{eff}}$;
  means for assigning the value of $\sigma_m$ to $\sigma_h$ if $f_D(\sigma_m)\geq N_{\mathit{eff}}$;
  means for activating the assignment means if $\sigma_h-\sigma_l$ is greater than a predetermined tolerance; and
  selection means for selecting a value for $\sigma$ based on the values of $N_{\mathit{eff}}$, $\sigma_l$, and $\sigma_h$ if $\sigma_h-\sigma_l$ is not greater than the predetermined tolerance.

14. The device of claim 13, wherein the selection means comprises means for selecting a value for $\sigma$ using the equation:

$$\sigma(D) = \sigma_l + (N_{\mathit{eff}} - f_D(\sigma_l))\frac{f_D(\sigma_h) - f_D(\sigma_l)}{\sigma_h - \sigma_l}.$$

15. A computer-implemented method for selecting a printer tonescale correction function for use in conjunction with a printer including a print engine, the method comprising steps of:
  (A) selecting an estimate of an inverse model of the print engine, the estimate of the inverse model having a constant part and a variable part;
  (B) evaluating and storing a value of the constant part of the estimate of the inverse model;
  (C) estimating a value of the variable part of the estimate of the inverse model based on a plurality of color values measured from output produced by the print engine; and
  (D) selecting the printer tonescale correction function based on the stored value of the constant part of the estimate of the inverse model and the estimated value of the variable part of the estimate of the inverse model; and wherein C designates an output color of the print engine, wherein $E^{-1}(C)$ designates the inverse model of print engine, wherein the estimate $G(C_0)$ of the inverse model of the print engine is defined as:

$$G(C_0)\begin{bmatrix}1\\C\end{bmatrix},\text{ wherein}$$

$$G(C_0) = \left[ E^{-1}(C_0) - \frac{\partial E^{-1}(C_0)}{\partial C}C_0 \quad \frac{\partial E^{-1}(C_0)}{\partial C} \right],$$

wherein the first component of $G(C_0)$ comprises the variable part of the estimate of the inverse model, and wherein the second component of $G(C_0)$ comprises the constant part of the estimate of the inverse model.

16. A device for selecting a printer tonescale correction function for use in conjunction with a printer including a print engine, the device comprising:
  means for selecting an estimate of an inverse model of the print engine, the estimate of the inverse model having a constant part and a variable part;
  means for evaluating and storing a value of the constant part of the estimate of the inverse model;
  means for estimating a value of the variable part of the estimate of the inverse model based on a plurality of color values measured from output produced by the print engine; and
  means for selecting the printer tonescale correction function based on the stored value of the constant part of the estimate of the inverse model and the estimated value of the variable part of the estimate of the inverse model; and wherein C designates an output color of the print engine, wherein $E^{-1}(C)$ designates the inverse model of print engine, wherein the estimate $G(C_0)$ of the inverse model of the print engine is defined as:

$G(C_0)[_C^1,$ wherein $G(C_0)=[E^{-1}(C_0)-\partial E^{-1}(C_0)C_0/\partial C \; \partial E^{-1}(C_0)/\partial C],$ wherein the first component of $G(C_0)$ comprises the variable part of the estimate of the inverse model, and wherein the second component of $G(C_0)$ comprises the constant part of the estimate of the inverse model.

17. A computer-implemented method for generating a printer tonescale correction function for use in conjunction with a printer including a print engine, the method comprising steps of:
  (A) identifying a plurality of goal color values;
  (B) identifying a first plurality of digits provided to the printer to produce a first printed image;
  (C) identifying a first plurality of density values provided to the print engine to produce the first printed image;
  (D) identifying a plurality of measured color values in the first printed image;

(E) selecting a weighting function, the weighting function having a regularization parameter that is a function of digit value;
(F) generating, based on the weighting function, a plurality of weights associated with the plurality of measured color values, wherein the plurality of weights are defined according to a Gaussian weighting function that weights each of the plurality of measured color values $C_i$ based on a distance between $C_i$ and a corresponding one of the goal color values;
(G) selecting an inverse model of the print engine based on the first plurality of density values, the plurality of measured color values, and the plurality of weights; and
(H) generating the printer tonescale correction function based on the inverse model.

18. The method of claim 17, further comprising a step of:
(I) applying the printer tonescale correction function to a digital image to produce a second plurality of density values; and
(J) providing the second plurality of density values to the print engine to produce a second printed image.

19. The method of claim 17, wherein the weight of each of the plurality of measured color values $C_i$ is proportional to $w(\|C_i - P_g(DU)\|, \sigma)$, wherein $P_g(DU)$ comprises the corresponding one of the plurality of goal color values, and wherein $w(x, \sigma) = e^{-x^2/\sigma^2}$.

20. The method of claim 17, wherein the inverse model comprises an inverse model matrix $\hat{G}$ as shown in the following equation:

$$\hat{G}(P_g(DU)) = YWA^T(AWA^T)^{-1},$$

wherein $P_g(DU)$ comprises one of the plurality of goal color values, wherein N is a number of samples in the first printed image, wherein $i = \{1, \ldots N\}$, wherein $d_i$ designates the ith one of the plurality of density values, wherein $C_i$ designates the ith one of the plurality of measured color values, wherein $$Y = [\, d_1 \ L \ d_N \,], \text{wherein}$$

$$A = \begin{bmatrix} 1 & L & 1 \\ C_1 & L & C_N \end{bmatrix}, \text{and wherein}$$

$$\hat{Y} = G(P_g(DU))A.$$

21. The method of claim 17, wherein the step (D) comprises a step of generating the plurality of weights based on the plurality of measured color values and the plurality of goal color values.

22. A device for generating a printer tonescale correction function for use in conjunction with a printer including a print engine, the device comprising:
means for identifying a plurality of goal color values;
means for identifying a first plurality of digits provided to the printer to produce a first printed image;
means for identifying a first plurality of density values provided to the print engine to produce the first printed image;
means for identifying a plurality of measured color values in the first printed image;
means for selecting a weighting function, the weighting function having a regularization parameter that is a function of digit value;
means for generating, based on the weighting function, a plurality of weights associated with the plurality of measured color values, wherein the plurality of weights are defined according to a Gaussian weighting function that weights each of the plurality of measured color values $C_i$ based on a distance between $C_i$ and a corresponding one of the goal color values;
means for selecting an inverse model of the print engine based on the first plurality of density values, the plurality of measured color values, and the plurality of weights; and
means for generating the printer tonescale correction function based on the inverse model.

23. The device of claim 22, further comprising:
means for applying the printer tonescale correction function to a digital image to produce a second plurality of density values; and
means for providing the second plurality of density values to the print engine to produce a second printed image.

24. The device of claim 22, wherein the weight of each of the plurality of measured color values $C_i$ is proportional to $w(\|C_i - P_g(DU)\|, \sigma)$, wherein $P_g(DU)$ comprises the corresponding one of the plurality of goal color values, and wherein $w(x, \sigma) = e^{-x^2/\sigma^2}$.

25. The device of claim 22, wherein the inverse model comprises an inverse model matrix $\hat{G}$ as shown in the following equation:

$$\hat{G}(P_g(DU)) = YWA^T(AWA^T)^{-1},$$

wherein $P_g(DU)$ comprises one of the plurality of goal color values, wherein N is a number of samples in the first printed image, wherein $i = \{1, \ldots N\}$, wherein $d_i$ designates the ith one of the plurality of density values, wherein $C_i$ designates the ith one of the plurality of measured color values, wherein $$Y = [\, d_1 \ L \ d_N \,], \text{wherein}$$

$$A = \begin{bmatrix} 1 & L & 1 \\ C_1 & L & C_N \end{bmatrix}, \text{and wherein}$$

$$\hat{Y} = G(P_g(DU))A.$$

26. The device of claim 22, wherein the means for generating comprises a step of generating the plurality of weights based on the plurality of measured color values and the plurality of goal color values.

* * * * *